United States Patent
Paiz

(10) Patent No.: US 6,614,893 B1
(45) Date of Patent: Sep. 2, 2003

(54) PARALLEL COMPUTER NETWORK AND METHOD FOR TELECOMMUNICATIONS NETWORK SIMULATION TO ROUTE CALLS AND CONTINUOUSLY ESTIMATE CALL BILLING IN REAL TIME

(76) Inventor: Richard S. Paiz, 16558 NE. 26th Ave., Apt. #2-F, N. Miami Beach, FL (US) 33160

(*) Notice: Subject to any disclaimer, the term of this patent is extended or adjusted under 35 U.S.C. 154(b) by 0 days.

(21) Appl. No.: 09/544,238

(22) Filed: Apr. 7, 2000

Related U.S. Application Data

(60) Provisional application No. 60/184,537, filed on Feb. 24, 2000.

(51) Int. Cl.[7] .................. H04M 1/24; H04M 15/00; H04M 7/00
(52) U.S. Cl. ..................... 379/112.01; 379/114.01; 379/114.08; 379/32.01; 379/133; 379/220.01; 379/221.11
(58) Field of Search ................. 379/32.01, 32.02, 379/32.03, 32.05, 33, 111, 112.01, 112.02, 112.03, 112.05, 112.08, 114.01, 114.02, 114.03, 133, 134, 137, 220.01, 221.08, 221.11, 211.14, 221.15; 370/352, 353, 366, 386, 390; 706/10, 26; 709/200, 220

(56) References Cited

U.S. PATENT DOCUMENTS

| | | | | | |
|---|---|---|---|---|---|
| 5,359,649 A | * | 10/1994 | Rosu et al. | ............ | 379/220.01 |
| 5,768,352 A | * | 6/1998 | Elliott et al. | ........... | 379/112.01 |
| 5,774,532 A | * | 6/1998 | Gottlieb et al. | ............. | 379/111 |
| 5,802,145 A | * | 9/1998 | Farris et al. | ............ | 379/32.01 |
| 5,809,282 A | * | 9/1998 | Cooper et al. | ............... | 395/500 |
| 5,878,113 A | * | 3/1999 | Bhusri | .................... | 379/112.01 |
| 5,949,875 A | * | 9/1999 | Walker et al. | ................ | 380/4 |

* cited by examiner

Primary Examiner—Curtis Kuntz
Assistant Examiner—Quoc D Tran
(74) Attorney, Agent, or Firm—Gold & Rizvi, P.A.; Glenn E. Gold; H. John Rizvi

(57) ABSTRACT

A telecommunications call routing and billing computer system includes a telecommunications network including a junction point including a call routing switching device, and including two call routing links meeting at the junction point and in communication with each other through the call routing switching device; and a call routing simulation network including a junction point simulation computer located at the junction point and in communication with the call routing switching device and the two call routing links. A method of placing a call through such a telecommunications network includes the steps of: placing one junction point simulation computer at each telecommunications network call junction point; for each call placed with the telecommunications network, plotting a call routing vector through the simulation network with forward chaining through the junction point simulation computers; and sending routing vector information back through the simulation network with rearward chaining to direct the call along a parallel routing vector through the telecommunications network. The method preferably includes the additional steps of: monitoring buffer levels of telecommunications network junction point computers with the simulation computer at each junction point; and using the buffer level information to shunt calls from telecommunications network junction point computers having smaller buffers to those having larger buffers.

1 Claim, 32 Drawing Sheets

Legend:
10: System
20: Simulation Network
24: Process Power Support Computers
26: Parent Simulation Computers
28: User Interface Computers
30: Telecommunications Network
32: Junction point Simulation Computer
34: Telecommunication Network Junction Point Computers

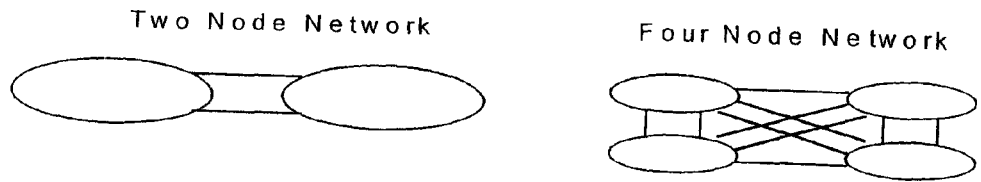
Network Traffic Management, HP Corporation, 1995.
*Figure 1 Diagram of two and four Node Networks.*
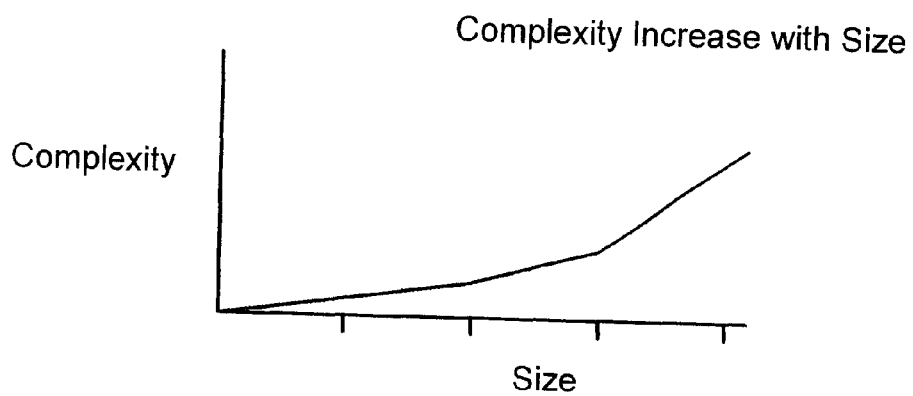
Network Traffic Management, HP Corporation, 1995.
*Figure 2 Complexity increases with Network Size.*
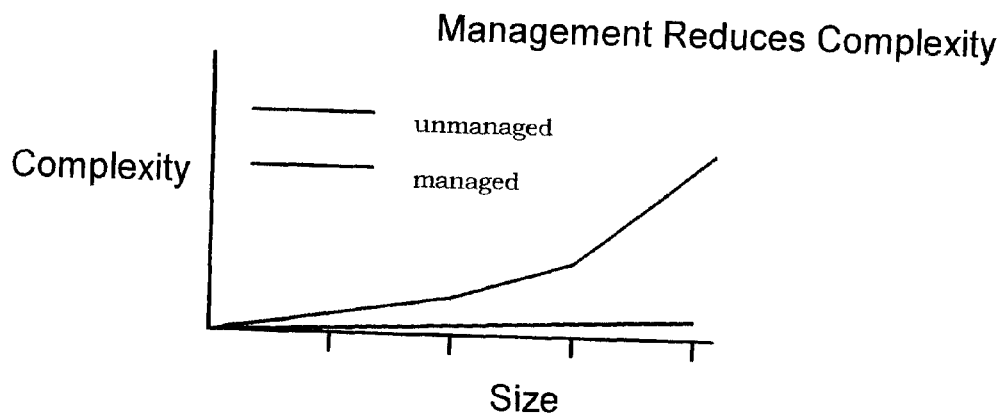
Network Traffic Management, HP Corporation, 1995.
*Figure 3 Management Reduces Complexity*

Management Synergy Example:

Once all the intelligent components have performed the correlation of each billing entity. The information must be stored in the Billing Engine.

IR = Insert Rate     I Billable Entities to Insert
E = Excess Record     B Buffer Resources

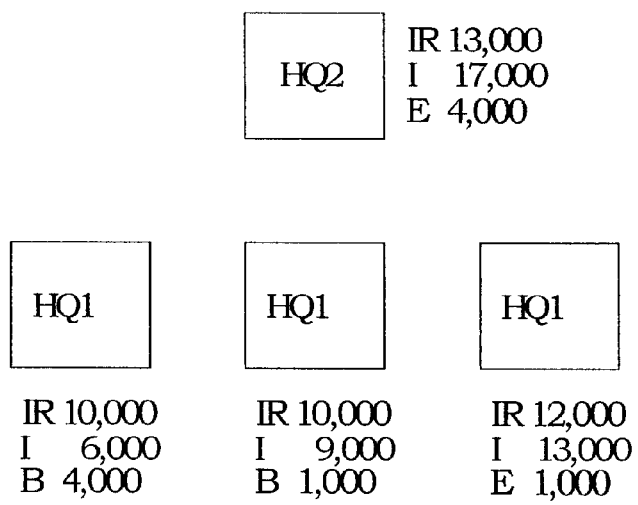

If no synergy exist and lateral integration among the components does not appl then 5,000 Excess records are sent to the HQ3.
The HBS move and shift resources for maximum efficiency, thus a 5,000 Buffer exist which is used to remove the 5,000 excess.

*Figure 4 Management Synergy Example.*

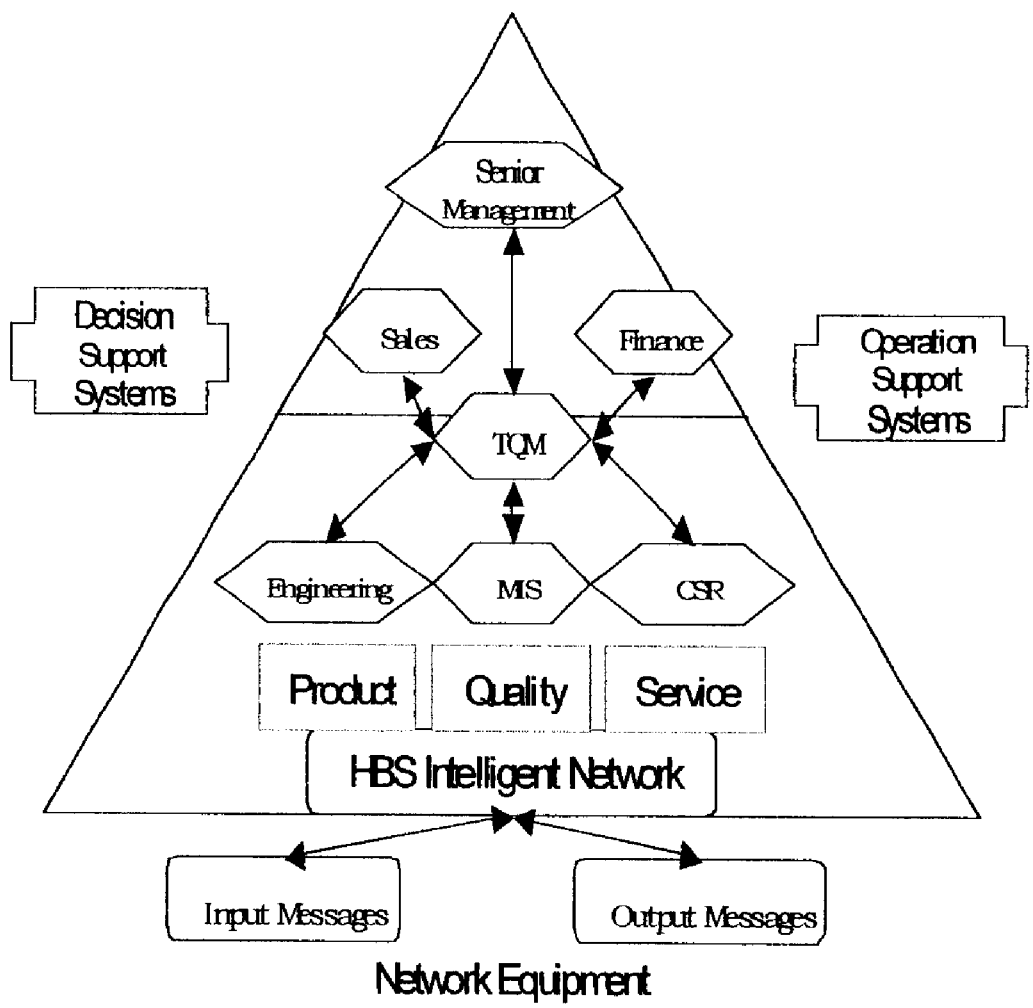
*Figure 5 Linkage between IBS and TQM*

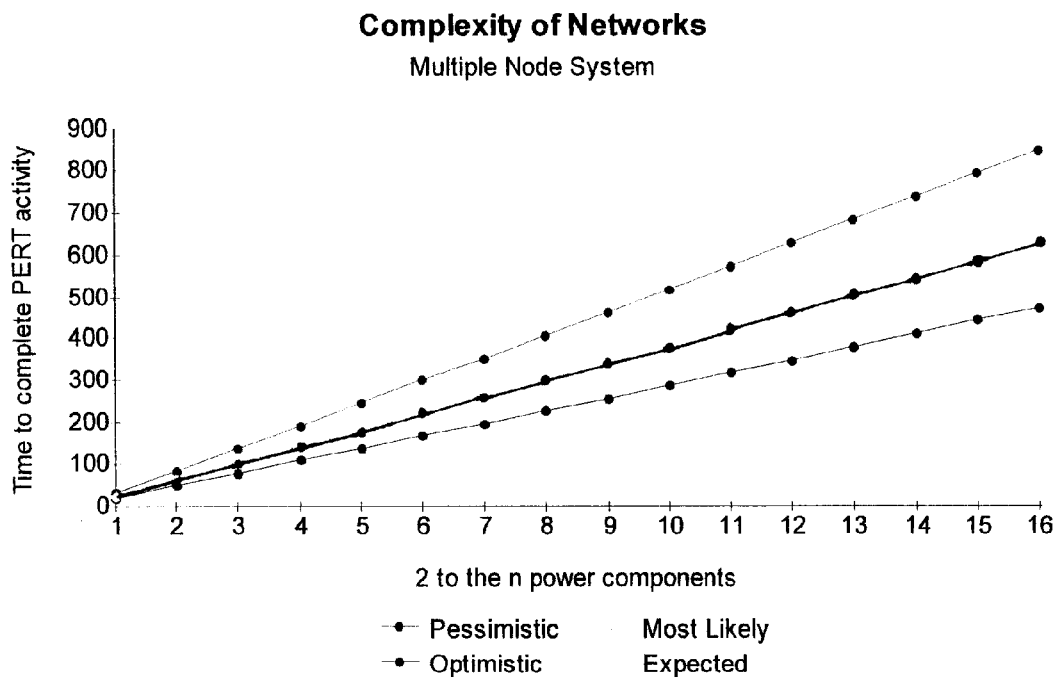
Figure 6 *Complexity of Multiple Node Networks.*
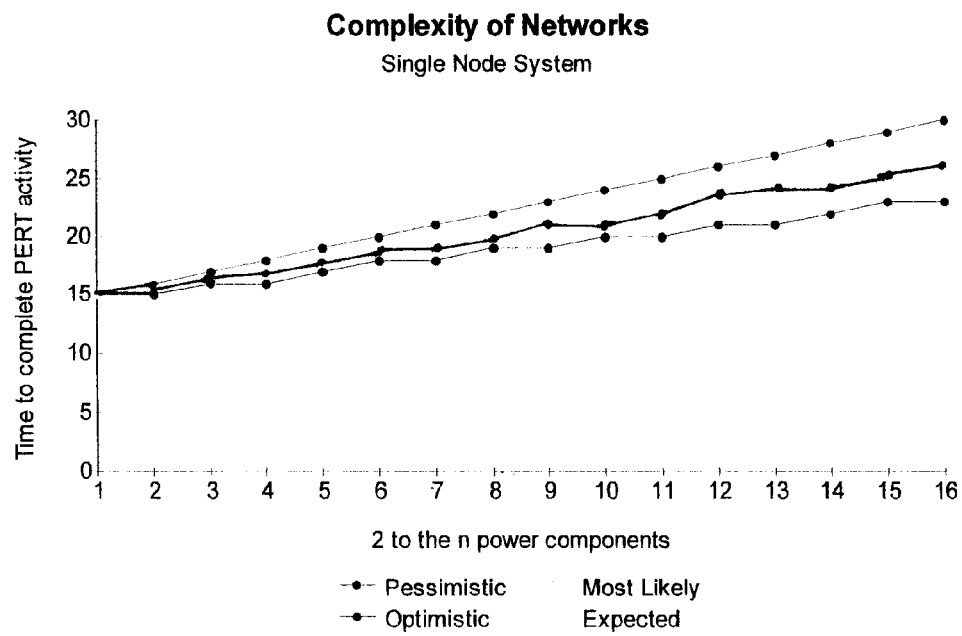
Figure 7 *Complexity of Single Node Networks.*

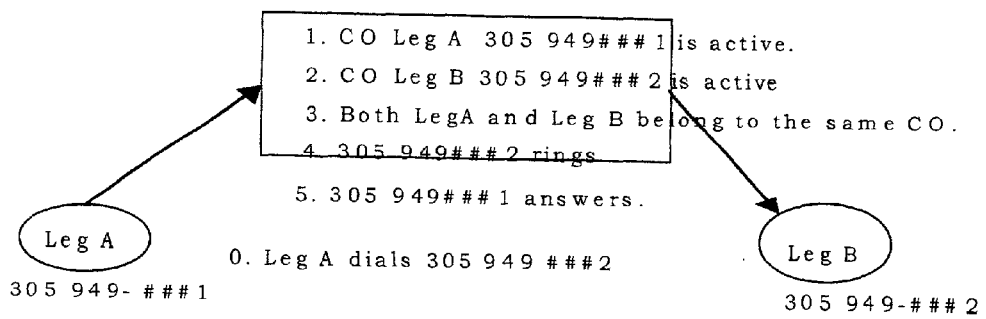
Figure 8 Diagram of an Intra Central Office Call (HQ0 parent).
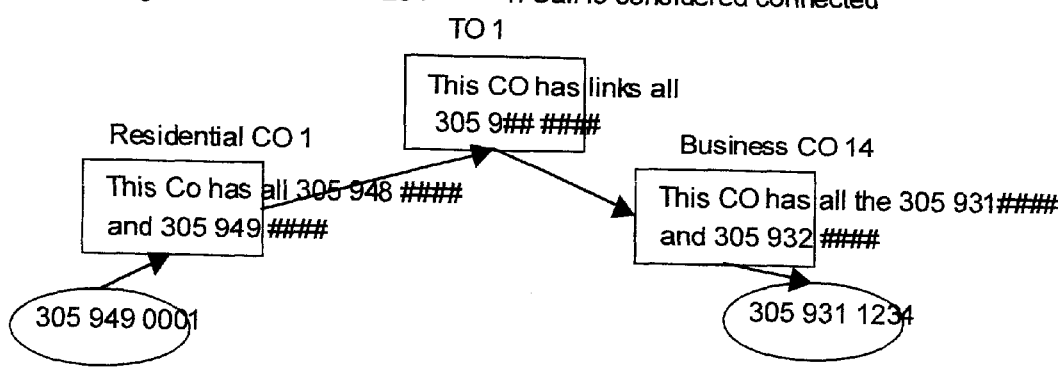
Figure 9 Diagram of an Intra Exchange Office Call (HQ1 Parent).

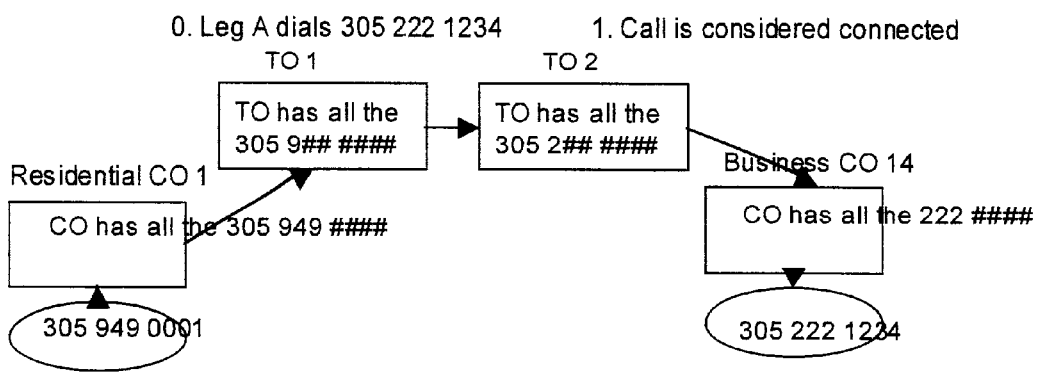
When Leg A and / or Leg B go on hook four CDR are generated. One for TO1, one for TO2, one for Residential CO1 and another for Business CO 14.
*Figure 10 Diagram of an Intra NPA Call (HQ2 parent).*

Intra LATA Call
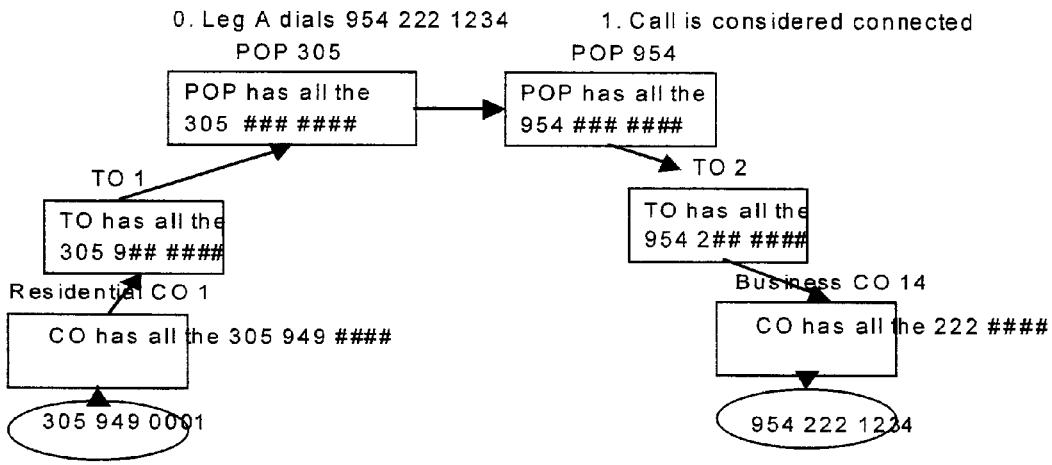
*Figure 11 Diagram of an Intra NPA Call (HQ3 parent)*
Intra Regional Call
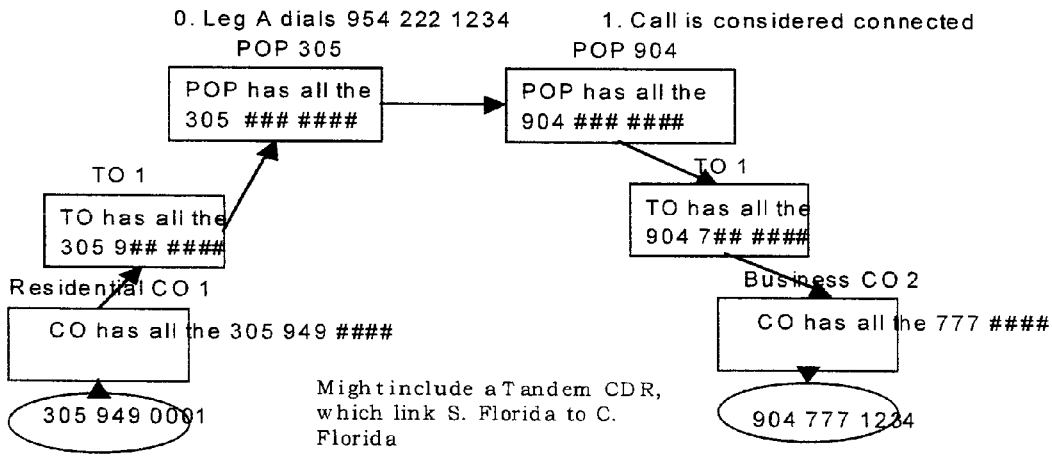
*Figure 12 Diagram of an Intra Regional Call (HQ4 parent)*

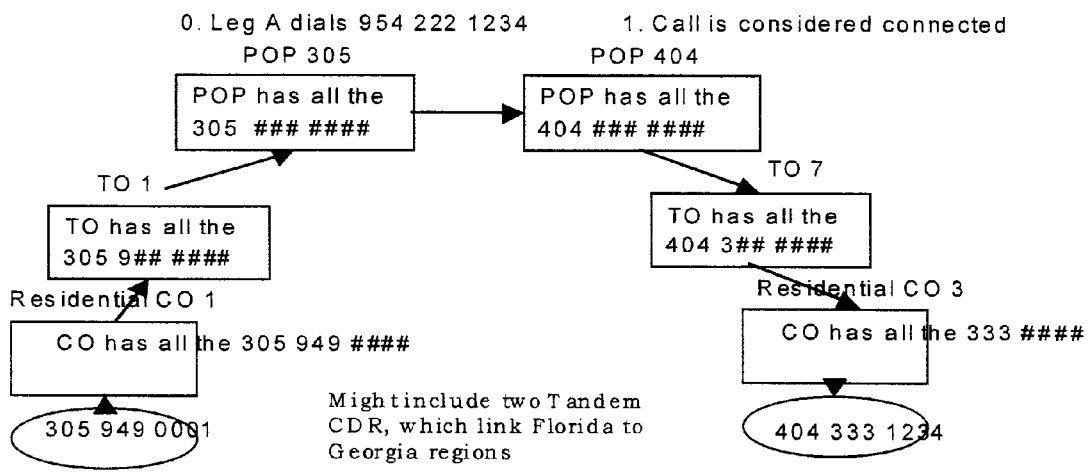
*Figure 13 Diagram of an Inter Regional Call (HQ5 parent)*

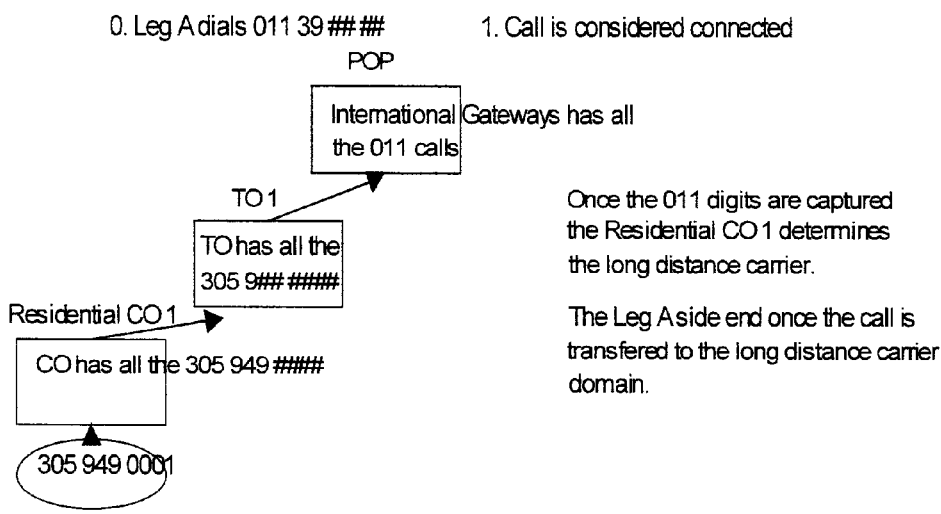
Figure 14 *Diagram of an International Long Distance Call (HQ5 Parent).*

Example of an Intelligent Component
80,000 port Alcatel S-12

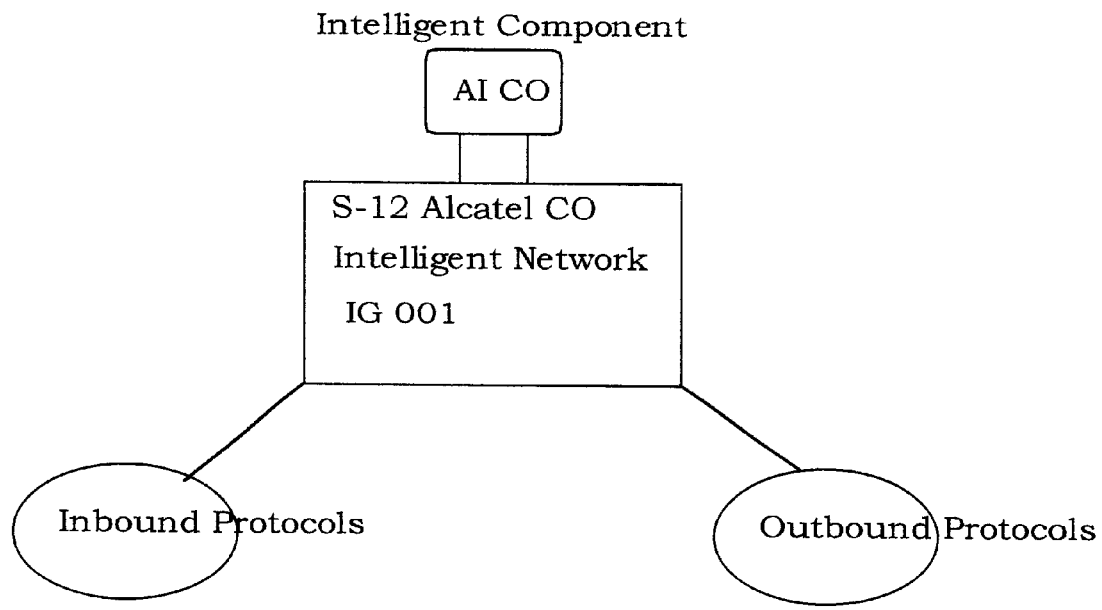

Every minute up to 15,000 CDR are processed.
The AI component scans the environment every second.
Every 5 seconds a new fuzzy state cycle begins.

Every time a new billable entity is generated the AI CO analyses the trunk information, Leg A and Leg B information to properly rate the call.

For every billable entity the CO generates a unique ID
Example IG 001 ########
When the CDR containing the end time of the call is received the system is able to complete the billable entity. At this point the information is sent to the billing engine.

*Figure 15 Example of an Intelligent Component (IC).*

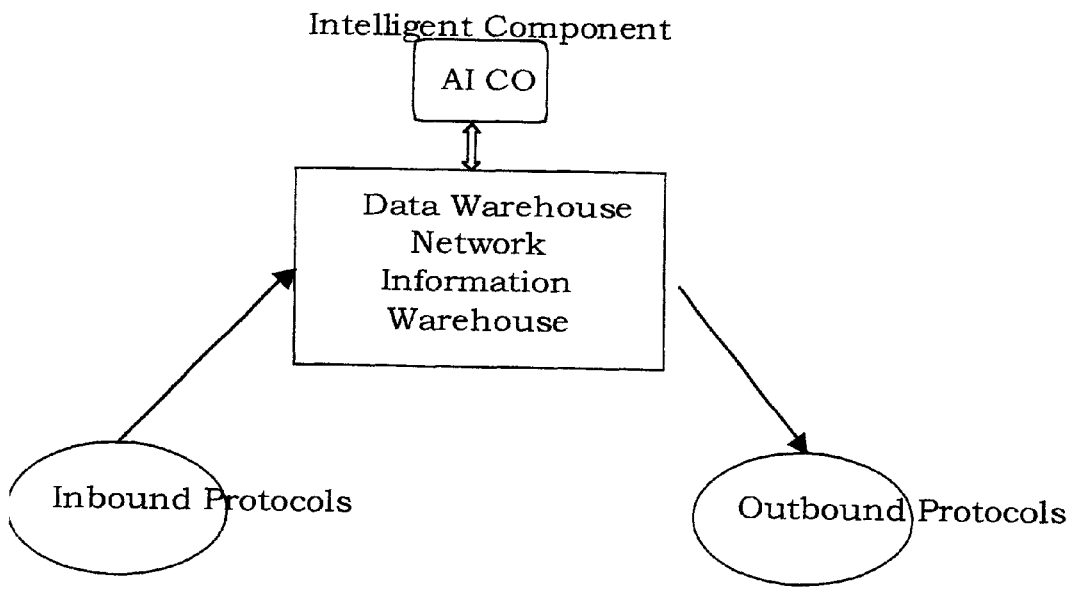

Every minute up to rated limit CDR are processed.
The AI component scans the environment every second.

Every 5 seconds a new fuzzy state cycle begins.

Every time a new billable entity is generated the AI CO analyses the trunk information, Leg A and Leg B information to properly rate the call.

Every minute, and each binary time interval the Data Warehouse receives updates from its hierachy and other IDW/INIW to determine system integrity and be able to immediately identify potential churn subscribers. Provisioning statistics as well as trending are the key component of this Data Warehouse that also is an IC.

*Figure 16 Example of an Intelligent Data Warehouse (IDW/INIW)*

Intra CO Call

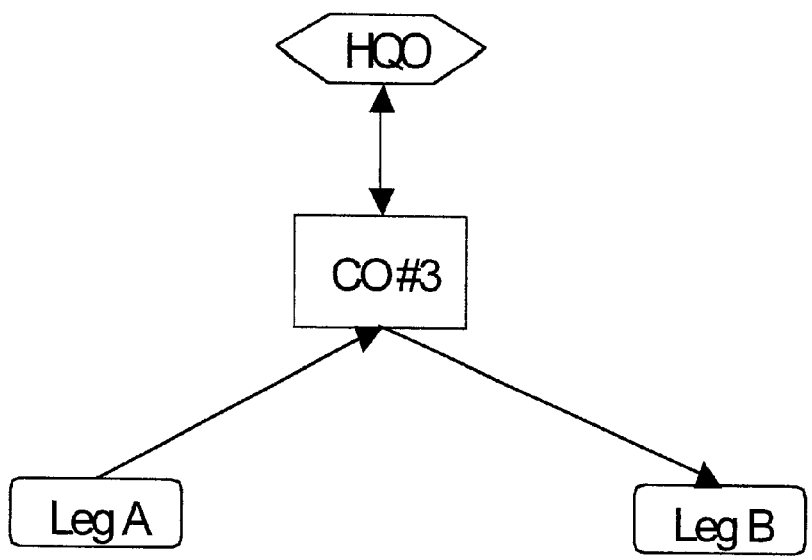

305 948 1234
Calling Party Leg A
HQ5 is BST        1
HQ4 is Florida    1
HQ3 is S. Fla     3
Leg A is     1134803

305 948 5678
Called Party Leg B
HQ2 is Miami      4
HQ1 is Miami      8

Leg B is  1134803

CO 1134803 initiates the call. CO 1134803 owns the call and generates the Vector CDR. 1 CDR must be correlated to make the billing entity.
Vector Magnitude looks like this 1134803 (Owner) n/a (Leg A CO) n/a (Leg B CO) 1134803
The unique ID for the call would be 1134803 ######### 1134803aaaa0000000000. Four letters and 0-16.777.216 range.

*Figure 17 IBS method of generating an IBS_Valid_CDR from a CO (Intra CO call HQ0).*

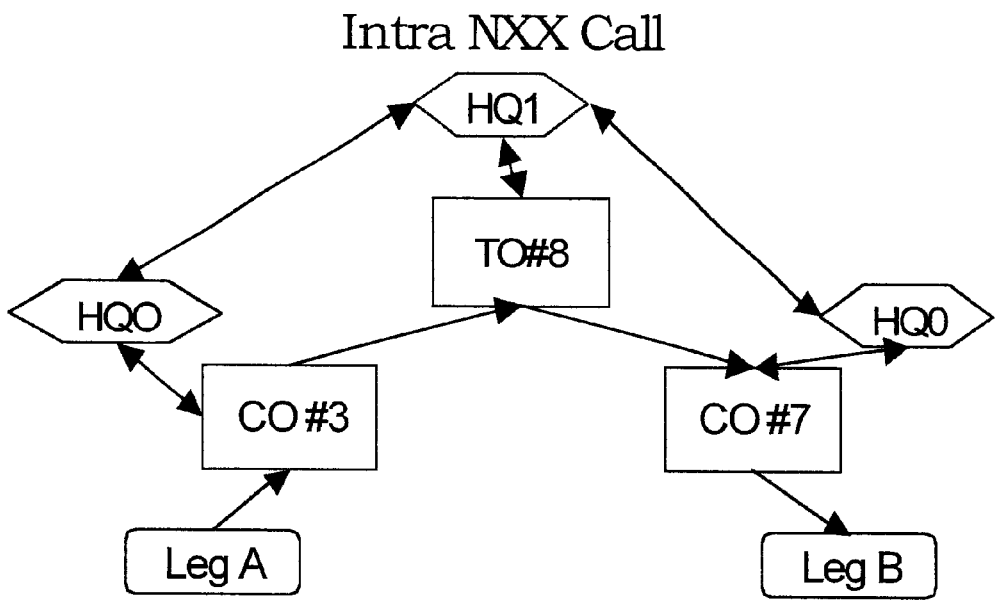
Figure 18 IBS method of generating an IBS_Valid_CDR from a CO (Intra NXX call HQ1).

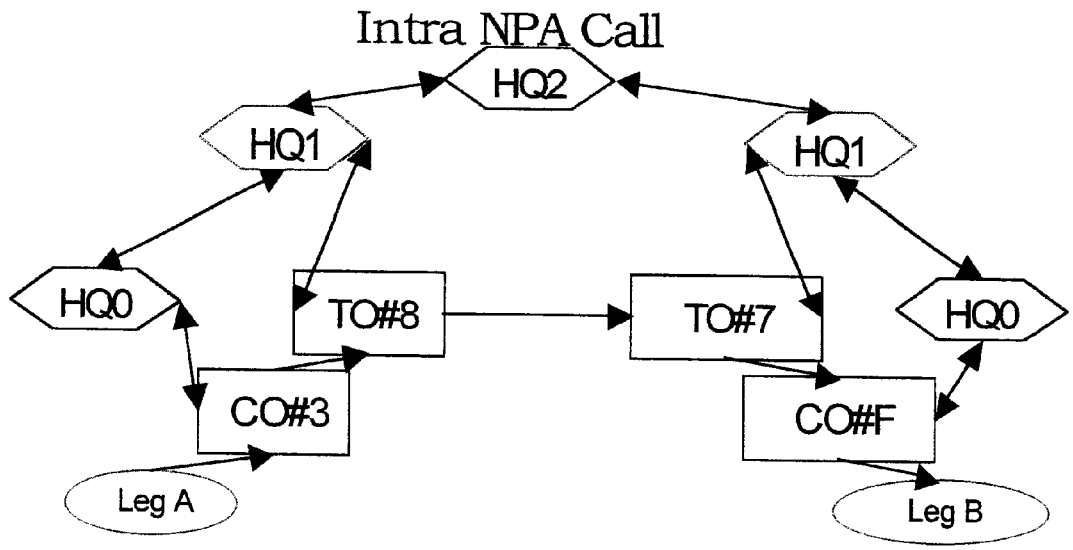
| 305-9490001 | | | 305 443 2354 | |
|---|---|---|---|---|
| North Miami Beach | | | Coral Gables | |
| HQ5 | BST | 1 | HQ1 Leg A | 8 |
| HQ4 | Florida | 1 | HQ1 Leg B | 7 |
| HQ3 | S. Fla | 3 | | |
| HQ2 | Miami | 4 | | |
Leg A is 1134803           Leg B is 113470F
CO 1134803 initiates the call. CO 1134 owns the call and generates the Vector CDR. HQ2. At least 4 CDR must be correlated to make the billing entity.
Vector Magnitude looks like this: 1134 (Owner) 803 (Leg A CO) 7OF (Leg B CO) 1134-803-7OF
*Figure 19 IBS method of generating an IBS_Valid_CDR from a CO (Intra NPA call HQ2).*

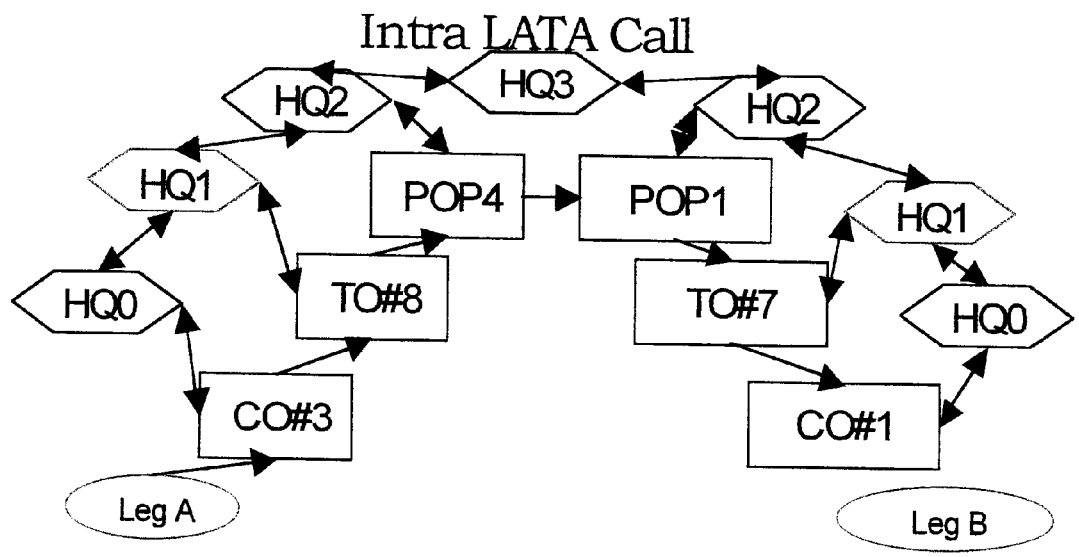
305-9490001
Miami
| HQ5 | BST | 1 |
| --- | --- | --- |
| HQ4 | Florida | 1 |
| HQ3 | S. Fla | 3 |
| HQ1 | Leg B | 7 |
407 671 9999
Orlando
| HQ2 Leg A | 4 |
| --- | --- |
| HQ2 Leg B | 1 |
| HQ1 Leg A | 8 |
Leg A is 1134803   Leg B is 1131701
CO 1134803 initiates the call. CO 113 owns the call and generates the Vector CDR. HQ3. At least 6 CDR must be correlated to make the billing entity.
Vector Magnitude looks like this: 113 (Owner) 4803 (Leg A CO) 1101 (Leg B CO)  113-4803-1101
*Figure 20 IBS method of generating an IBS_Valid_CDR from a CO (Intra LATA call HQ3).*

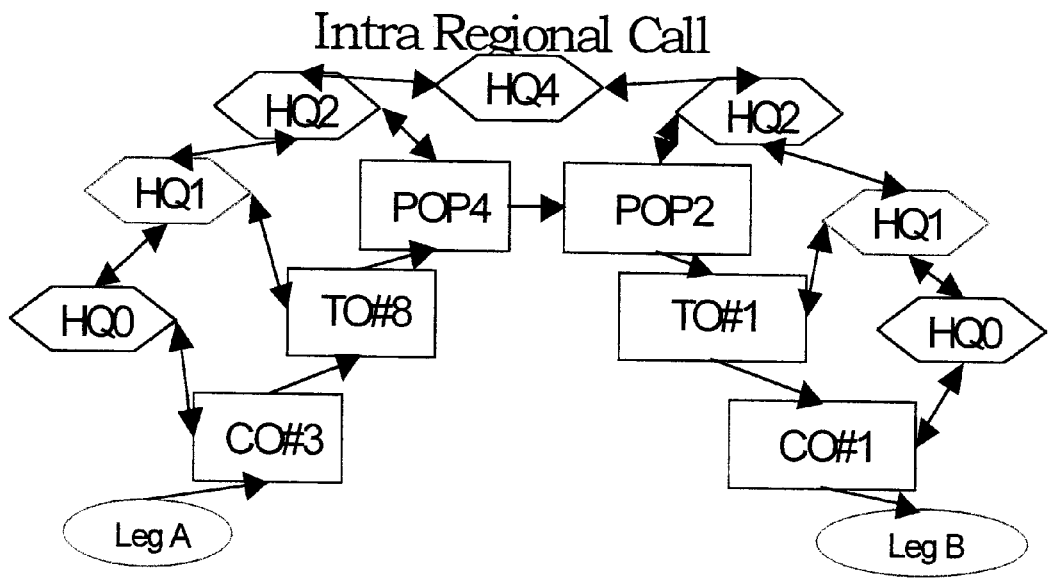
| | | | | | |
|---|---|---|---|---|---|
| 305-9490001 | | | 904 671 9999 | | |
| Miami | | | Jacksonville | | |
| HQ5 | BST | 1 | HQ3 Leg A | 3 | |
| HQ4 | Florida | 1 | HQ3 Leg B | 2 | |
| HQ2 | Leg A | 4 | HQ1 Leg A | 8 | |
| HQ2 | Leg B | 1 | HQ1 Leg B | 1 | |
Leg A is 1134803      Leg B is 1121105
CO 1134803 initiates the call. CO 11 owns the call and generates the Vector CDR. HQ4. At least 6 CDR must be correlated to make the billing entity.
Vector Magnitude looks like this: 11 (Owner) 34803 (Leg A CO) 21105 (Leg B CO) 11-34803-21105
*Figure 21 IBS method of generating an IBS_Valid_CDR from a CO (Intra Regional call HQ4).*

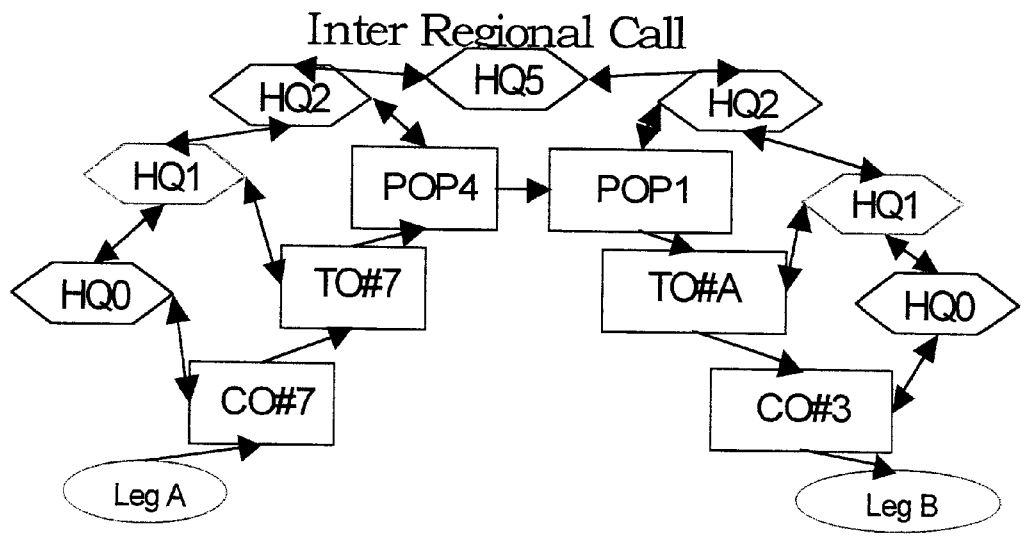

Inter Regional Call

| 305 525 0001 Miami | | | 404 777 1234 Atlanta | | |
|---|---|---|---|---|---|
| HQ5 | BST | 1 | HQ5 | BST | 1 |
| HQ4 | Florida | 1 | HQ4 | Georgia | 2 |
| HQ3 | S Fla | 3 | HQ3 | N Geo | 1 |
| HQ2 | | 4 | HQ2 | | 1 |
| HQ1 | | 7 | HQ1 | | A |
| Leg A is 1134707 | | | Leg B is 1211A03 | | |

CO 1134807 initiates the call. CO 1 owns the call and generates the Vector CDR. HQ5. At least 6 CDR must be correlated to make the billing entity.

Vector Magnitude looks like this: 1 (Owner) 134707 (Leg A CO) 211A03 (Leg B CO) 1-134707-211A03

*Figure 22 IBS method of generating an IBS_Valid_CDR from a CO (Inter Regional call HQ5).*

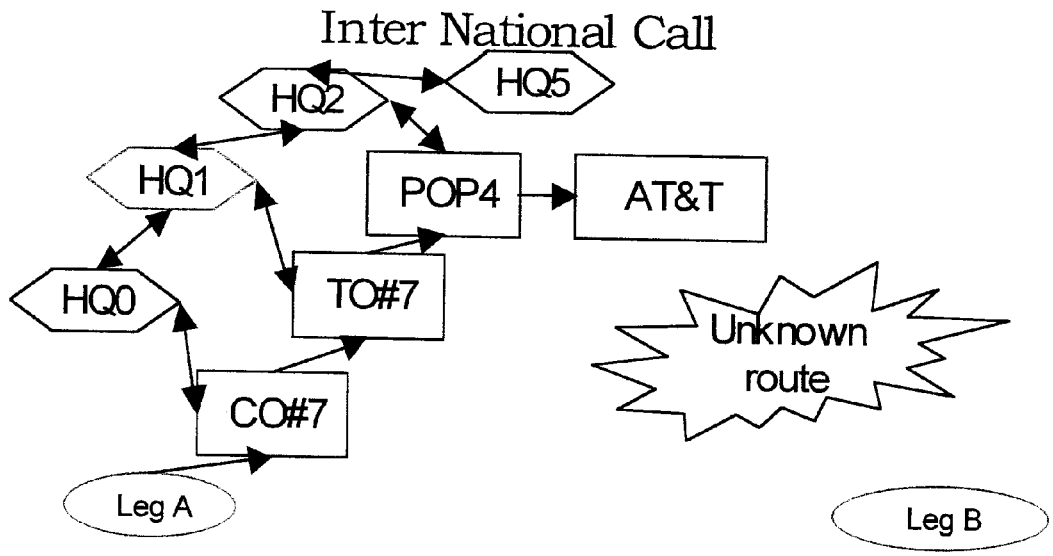

305 525 0001
Miami
| HQ5 | BST | 1 |
| HQ4 | Florida | 1 |
| HQ3 | S Fla | 3 |
| HQ2 | | 4 |
| HQ1 | | 7 |

011502261324
Guatemala
| HQ5 | AT&T | 1 |

Leg A is 1134707    Leg B is out of the domain.
CO 1134807 initiates the call. HQ5 owns the call and generates the Vector CDR. At least 3 CDR must be correlated to make the billing entity. ##### International ### Regional (CLEC) # Local (CLEC). CLEC the subscriber belongs to another network.
Vector Magnitude looks like this: 1 (Owner) 134707

*Figure 23 IBS method of generating an IBS_Valid_CDR from a CO (International call HQ5).*

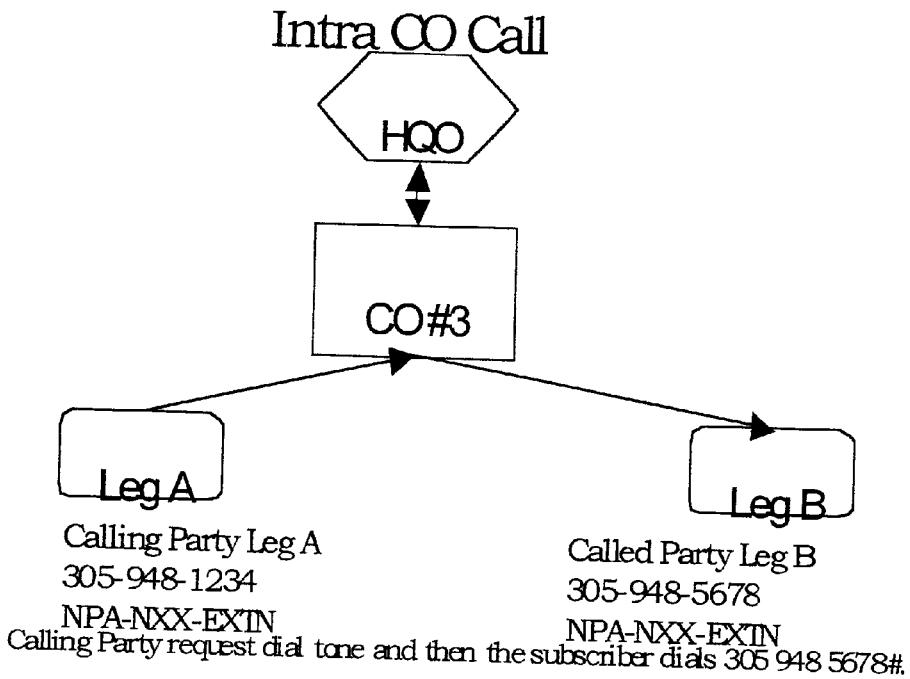

Calling Party request dial tone and then the subscriber dials 305 948 5678#.

An (IAM) messages is sent as the CO determines that 305 948 5678 is a valid subscriber within its own domain. HQ0 upon receiving the IAM messages creates a vector HQ5, HQ4, HQ3,HQ2, HQ1, Q3 (HQ0) Value, SSN, and a new record HBS_Billing_Entity is inserted. EX. 1131103. HQ0 identifies Leg A and Leg B as being part of its own domain. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. No Leg B nor Tandem data

*Figure 24 IBS method of generating an IBS_Vector_CDR from SS7 protocol packets (ISUP and/or ATM) Intra-CO call (HQ0 Parent).*

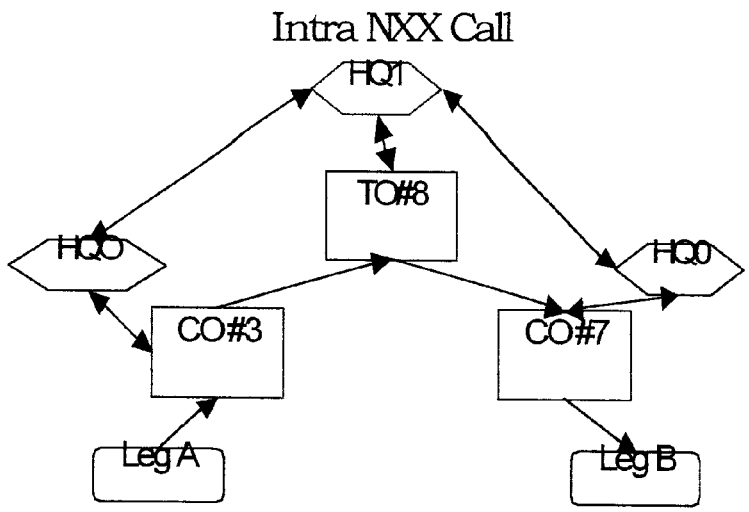

Calling Party Leg A
305-948-1234
NPA-NXX-EXTN

Called Party Leg B
305-938-5678
NPA-NXX-EXTN

Calling Party request dial tone and then the subscriber dials 305 938 5678#.

An (IAM) messages is sent as the CO determines that 305 938 5678 is doesn't belong to its own domain. The HQ0 searches and determines that HQ1 is the most probable owner. HQ0 upon receiving the IAM messages creates a SSN and then send a HBS_Vector_CDR message to TO#8 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. No Tandem data. EX 113108-03-07~
Vector Trajectory Update
CO#3    113##-03-##~   via forward chaining (FC) IAM message
TO#8    11308-03-##~   via forward chaining (FC) IAM message
CO#7    11308-03-07~   via backward chaining (BC) ACM message

*Figure 25 IBS method of generating an IBS_Vector_CDR from SS7 protocol packets (ISUP and/or ATM) Intra-NXX call (HQ1 Parent).*

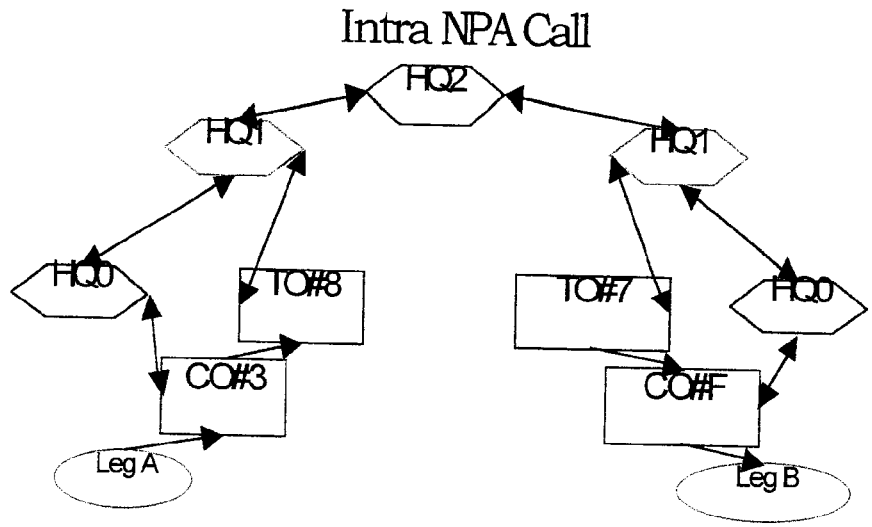

Intra NPA Call

Calling Party Leg A
305-948-1234
NPA-NXX-EXTN

Called Party Leg B
305-338-5678
NPA-NXX-EXTN

Calling Party request dial tone and then the subscriber dials 305 338 5678#.

An (IAM) messages is sent as the CO determines that 305 338 5678 is doesn't belong to its own domain. The HQ0 searches and determines that HQ2 is the most probable owner. HQ0 upon receiving the IAM messages creates a SSN and then send a HBS_Vector_CDR message to TO#8 IC, POP #4 IC, TO#7 IC, CO#0F IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. No Tandem data. EX 1134~###~###~ Vector Trajectory Update

| | | | |
|---|---|---|---|
| CO#3 | 1134~#03~###~ | IAM (FC) | Calling Party (Leg A) Owner |
| TO#8 | 1134~803~###~ | IAM (FC) | |
| POP#4 | 1134~803~###~ | IAM (FC) | HQ2 Miami, FLA (Dade County NPA) Vector Owner |
| TO#7 | 1134~703~7##~ | IAM (FC) | |
| CO#F | 1134~703~170F~ | ACN (BC) | Called Party (Leg B) Owner |

*Figure 26 IBS method of generating an IBS_Vector_CDR from SS7 protocol packets (ISUP and/or ATM) Intra-NPA call (HQ2 Parent)*

Intra LATA Call

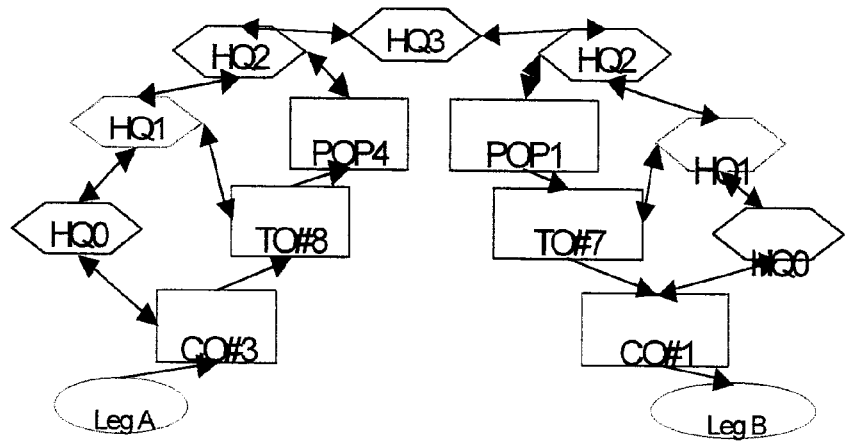

Calling Party Leg A
305-948-1234
NPA-NXX-EXTN

Called Party Leg B
954-338-5678
NPA-NXX-EXTN

Calling Party request dial tone and then the subscriber dials 954 338 5678#.

An (IAM) messages is sent as the CO determines that 954 338 5678 is doesn't belong to its own domain. The HQ0 searches and determines that HQ3 is the most probable owner. HQ0 upon receiving the IAM messages creates a SSN and then send a HBS_Vector_CDR message to TO#8 IC, POP #4 IC, POP#1 IC, TO#7 IC, CO#1 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. NoTandem data EX 113~####~####~

Vector Trajectory Update
CO#3    113~##03~####~    IAM (FC)    Calling Party (Leg A) Owner
TO#8    113~#803~####~    IAM (FC)
POP#4   113~4803~####~    IAM (FC)    HQ3 South Florida Lata Vector Owner
POP#1   113~4803~1###~    IAM (FC)
TO#7    113~4803~17##~    IAM (FC)
CO#1    113~4803~1701~    ACN (BC)    Called Party (Leg B) Owner

*Figure 27 IBS method of generating an IBS_Vector_CDR from SS7 protocol packets (ISUP and/or ATM) Intra-LATA call (HQ3 Parent).*

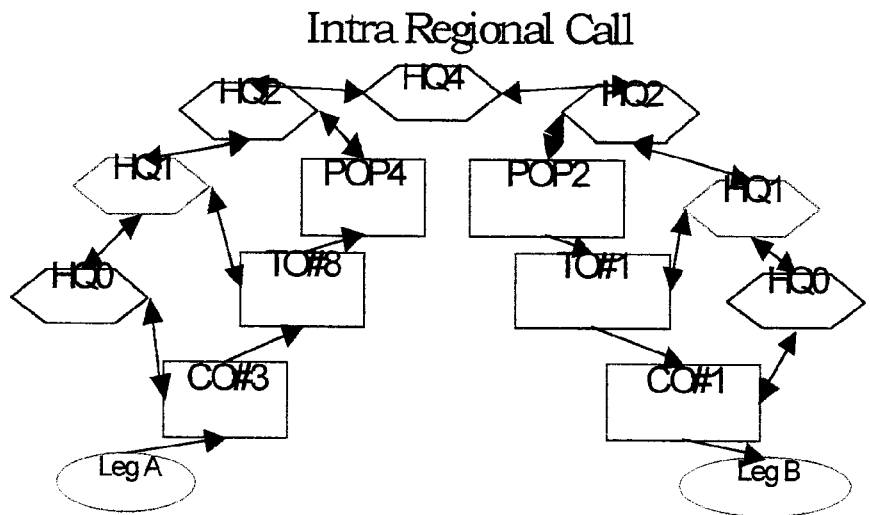

Intra Regional Call

Calling Party Leg A
305-948-1234
NPA-NXX-EXTN

Called Party Leg B
904-777-5678
NPA-NXX-EXTN

Calling Party request dial tone and then the subscriber dials 904 777 5678#.
*** This call has a TandemPOP connection between POP#4 and POP#2.
An (IAM) messages is sent as the CO determines that 904 777 5678 is doesn't belong to its own domain. The HQ0 searches and determines that HQ4 is the most probable owner. HQ0 upon receiving the IAM messages creates a SSN and then send a HBS_Vector_CDR message to TO#8 IC, POP #4 IC, POP#2 IC, TO#1 IC, CO#1 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. EX 11~#####~#####-X~ Vector Trajectory Update

| | | | |
|---|---|---|---|
| CO#3 | 11~3##03~####~ | IAM (FC) | Calling Party (Leg A) Owner |
| TO#8 | 11~3#803~####~ | IAM (FC) | |
| POP#4 | 11~34803~####~ | IAM (FC) | HQ5 BST Domain Vector Owner |
| PTO#X | 11~34803~####-X~ | IAM (FC) | |
| POP#2 | 11~34803~22###-X~ | IAM (FC) | |
| TO#1 | 11~34803~221##-X~ | IAM (FC) | |
| CO#1 | 11~34803~22101-X~ | ACN (BC) | Called Party (Leg B) Owner |

*Figure 28 IBS method of generating an IBS_Vector_CDR from SS7 protocol packets (ISUP and/or ATM) Intra-Regional call (HQ4 Parent)*

Inter Regional Call

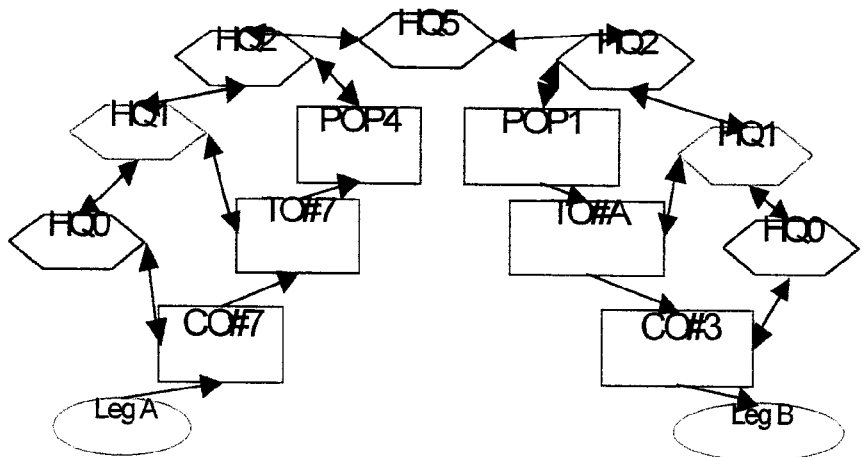

Calling Party Leg A
305-948-1234
NPA-NXX-EXTN

Called Party Leg B
404-777-5678
NPA-NXX-EXTN

Calling Party request dial tone and then the subscriber dials 404 777 5678#.
*** This call has a TandemPOP connection between POP#4 and POP#2.
An (IAM) messages is sent as the CO determines that 404 777 5678 is doesn't belong to its own domain. The HQ0 searches and determines that HQ5 is the most probable owner.
HQ0 upon receiving the IAM messages creates a SSN and then send a HBS_Vector_CDR message to TO#8 IC, POP #4 IC, POP#2 IC, TO#1 IC, CO#1 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. EX 11~#####~#####~X~
Vector Trajectory Update

| | | | |
|---|---|---|---|
| CO#3 | 11~3##03~####~ | IAM (FC) | Calling Party (Leg A) Owner |
| TO#8 | 11~3#803~####~ | IAM (FC) | |
| POP#4 | 11~34803~####~ | IAM (FC) | HQ5 BST Domain Vector Owner |
| PTO#X | 11~34803~####~X~ | IAM (FC) | |
| POP#2 | 11~34803~22###~X~ | IAM (FC) | |
| TO#1 | 11~34803~221##~X~ | IAM (FC) | |
| CO#1 | 11~34803~22101~X~ | ACN (BC) | Called Party (Leg B) Owner |

*Figure 29 IBS method of generating an IBS_Vector_CDR from SS7 protocol packets (ISUP and/or ATM) Inter-Regional call (HQ5 Parent)*

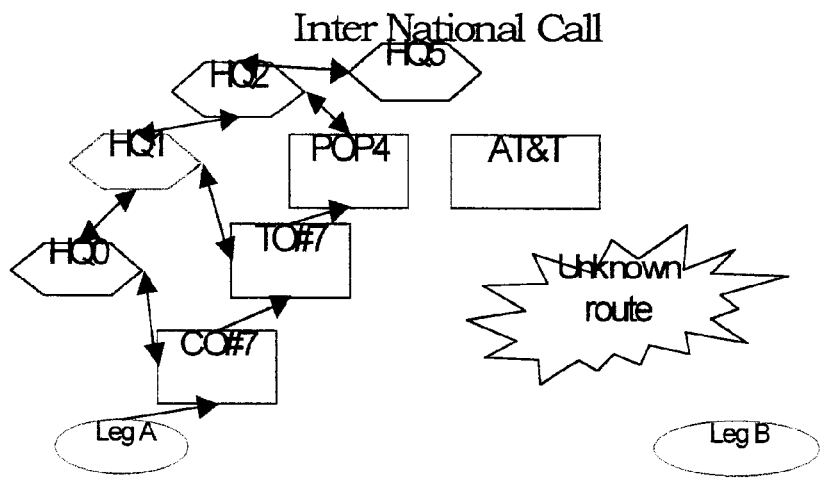

| Calling Party Leg A | Called Party Leg B |
|---|---|
| 305-948-1234 | 011-5022-61324 |
| NPA-NXX-EXTN | INT-CC-EXTN |

Calling Party request dial tone and then the subscriber dials 011502261324#.
An (IAM) messages is sent as the CO determines that 011 5022 61324 is an international call and must be routed to AT&T. The HQ0 searches and determines that HQ5 is the most probable owner. HQ0 upon receiving the IAM messages creates a SSN and then send a HBS_Vector_CDR message to TO#8 IC, POP #4 IC. When the ANM or ACM message is received an Update_Vector_CDR message is generated and the HBS_Vector_CDR is further updated. Then a REL_A or REL_B message is received an a Release_Vector_CDR message is generated and HBS_Vector_CDR is further updated. EX 1~13####~
Vector Trajectory Update
CO#3   1~13##03~       IAM (FC)  Calling Party (Leg A) Owner
TO#8   1~13#803~       IAM (FC)
POP#4  1~134803~       IAM (FC)  HQ5 BST Domain International Call When Leg B doesn't belong to the BST domain it is possible that the owning Vector HQ may adjust the vector trajectory.

Example a Call start from a Leg A owner which belongs to a CLEC but uses BST network.

*Figure 30 IBS method of generating an IBS_Vector_CDR from SS7 protocol packets (ISUP and/or ATM) Inter-National call (HQ5 Parent)*

Sample BST Organizational Structure

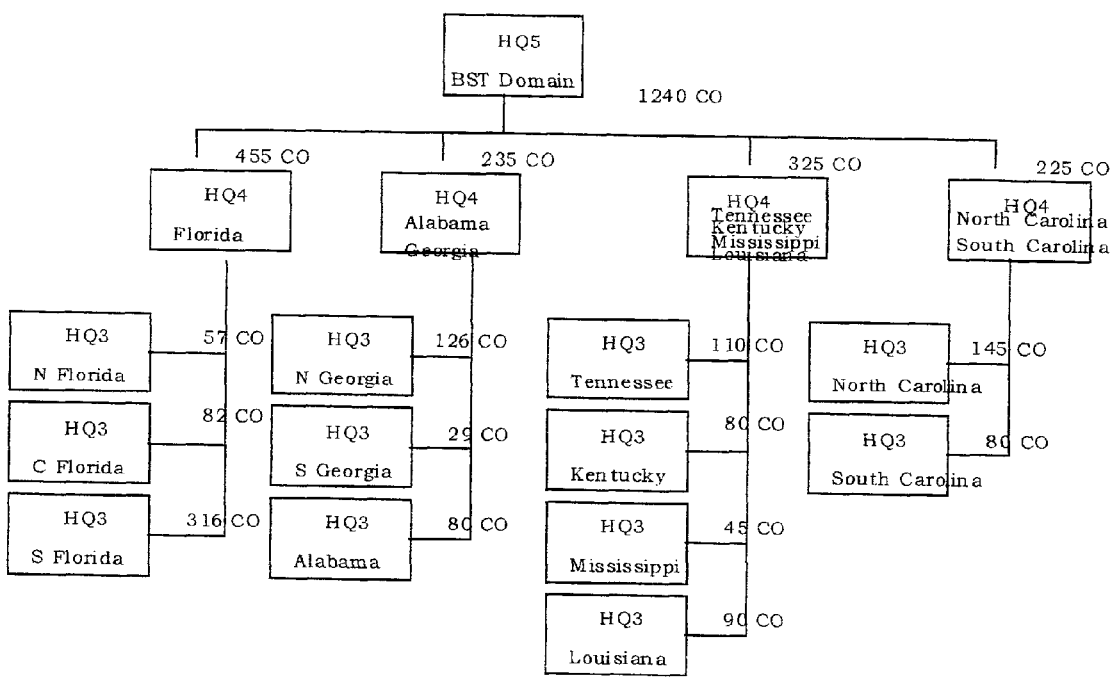

Figure 31 Sample BST organizational hierarchy structure.

BST organization was divided into four regions and twelve LATA districts. The number of CO a HQ has is the basis to determine the probability of traffic flow.

If a call originates from Miami (Dade), Florida and is considered to be an Intra-LATA (Florida Region) the probability the call goes to C Florida is 59% or (82/(82 + 57) * 100) and the probability the call goes to N Florida is 41% or (57/(82 + 57) * 100).

The probability that a call destination for an Intra-LATA BST domain is South Carolina originating from Florida is (1) = 28.66 % or (225 / (225 + 235 + 325)) to arrive on the Carolinas Region. The probability a Carolinas call goes to South Carolina is (2) 35.56% (80/225). (1) * (2) = 10.19%.

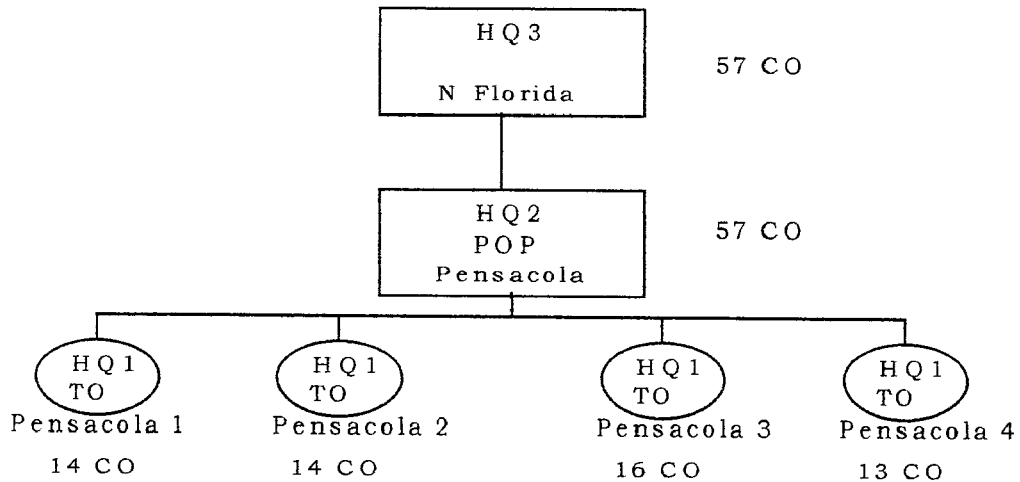
*Figure 32 Sample North Florida Network*
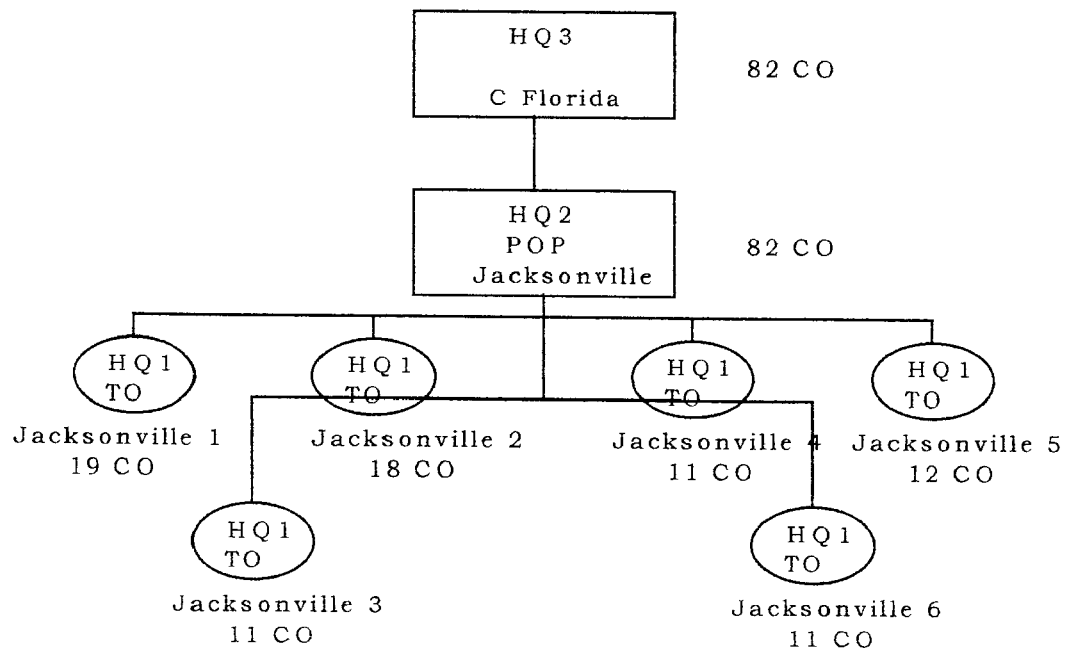
*Figure 33 Sample Central Florida Network*

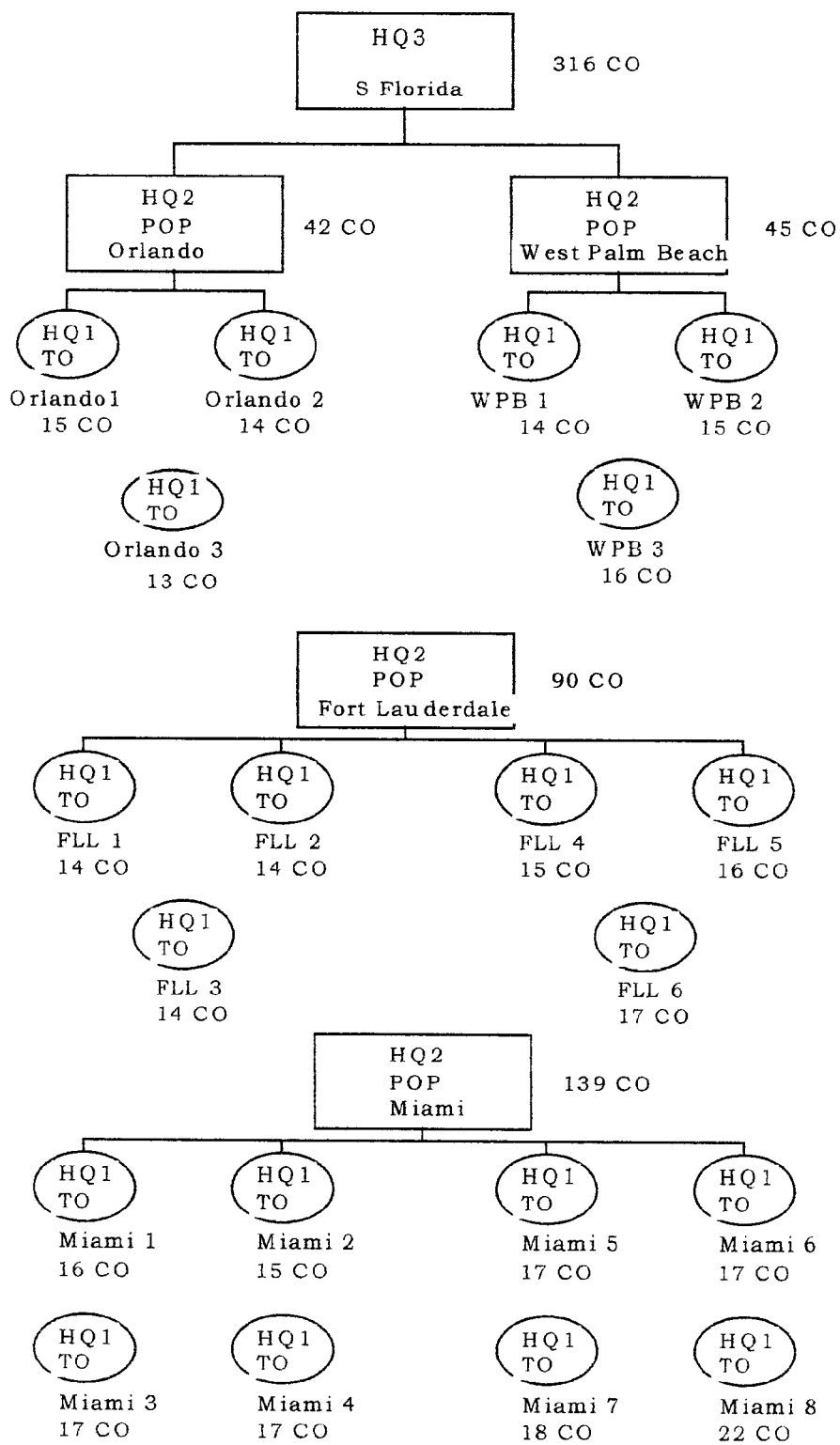
Figure 34 Sample South Florida Network

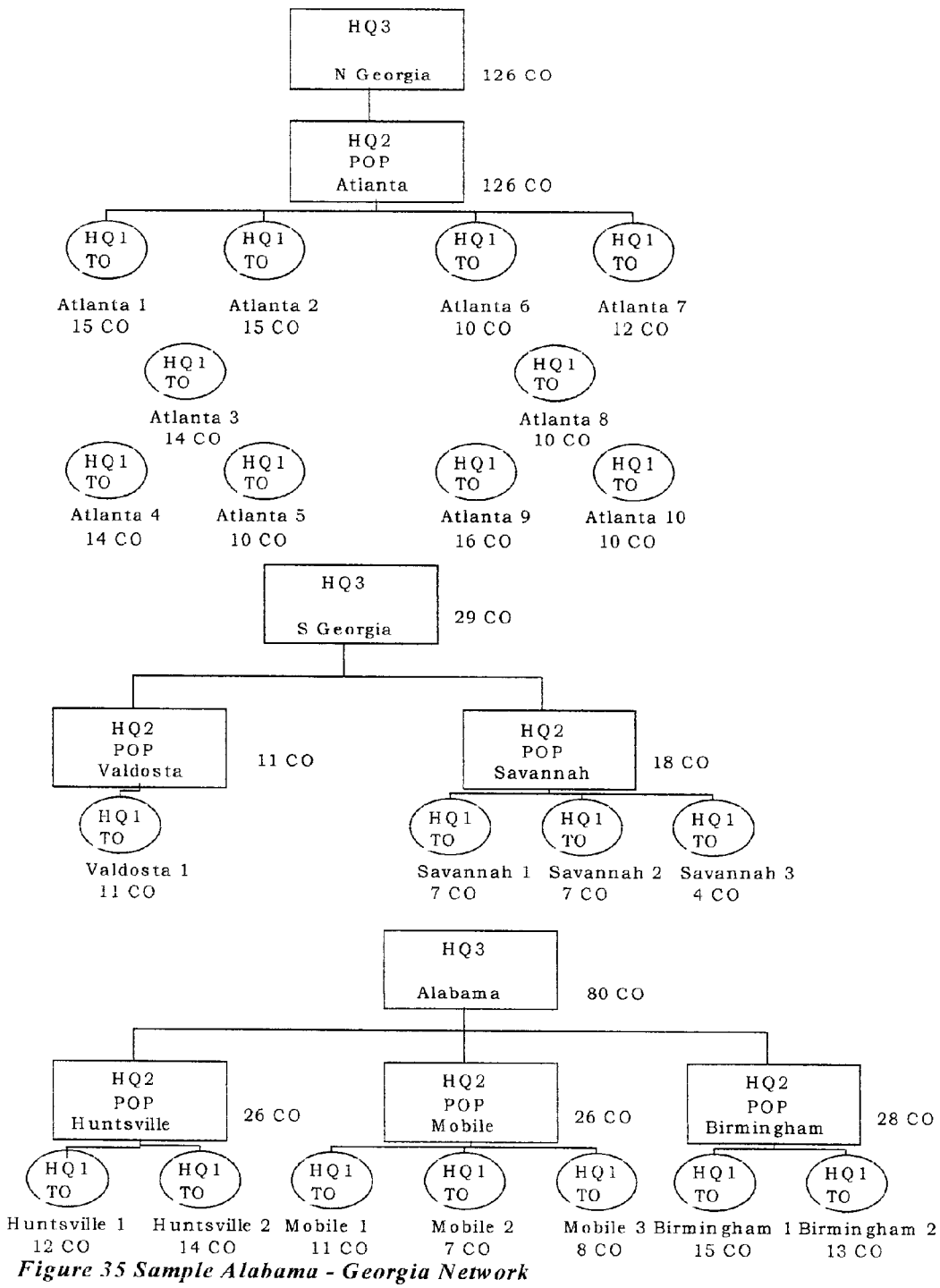
Figure 35 Sample Alabama - Georgia Network

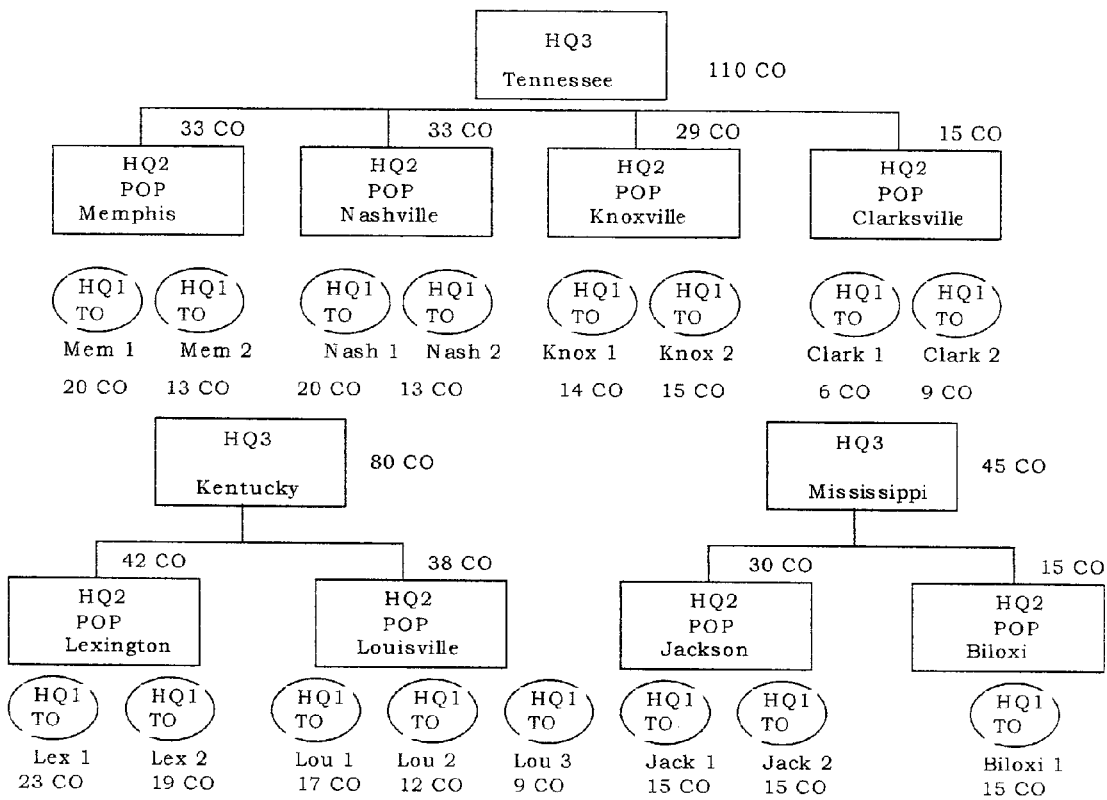
*Figure 36 Sample Tennessee - Kentucky - Mississippi - Louisiana Network*

North Carolina - South Carolina Region
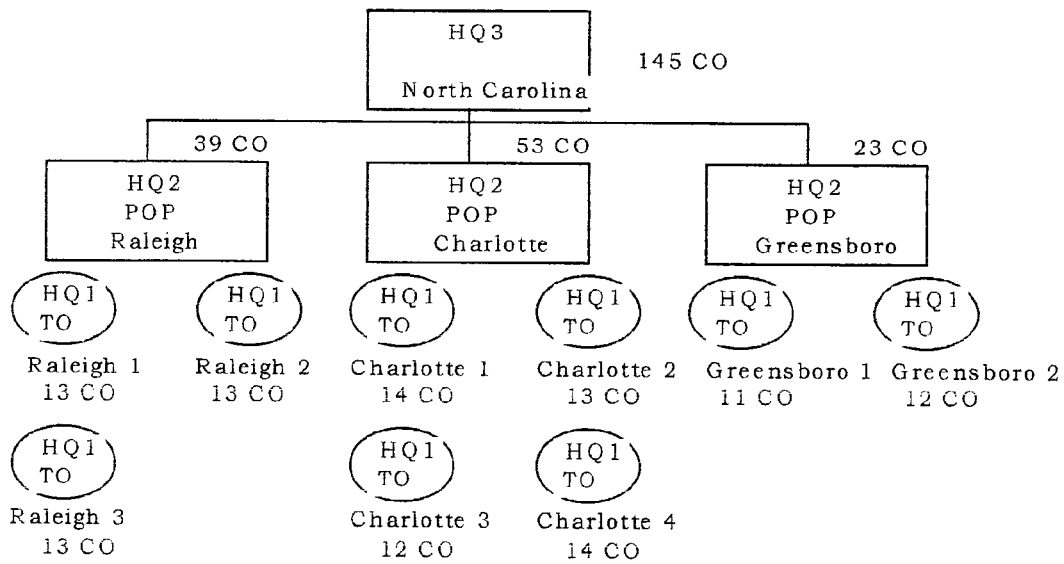
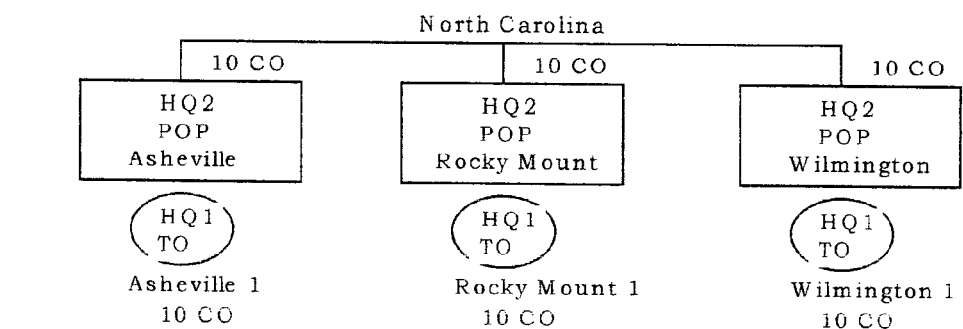
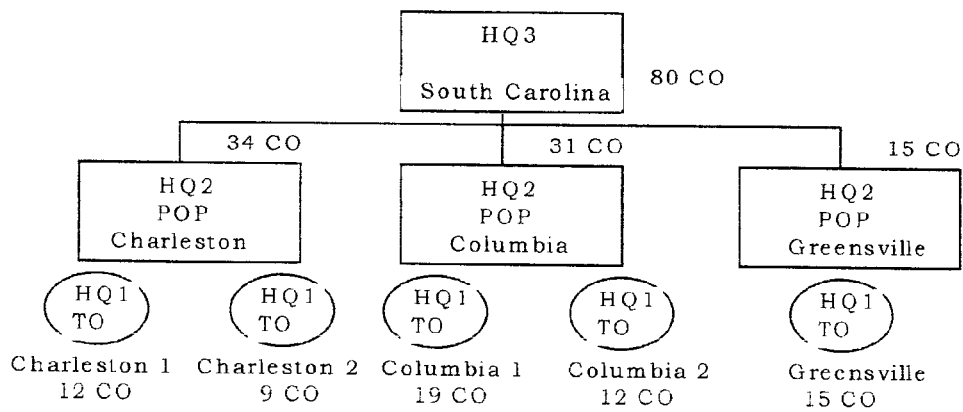
Figure 37 South Carolina - North Carolina Network Legend:
- 10: System
- 20: Simulation Network
- 24: Process Power Support Computers
- 26: Parent Simulation Computers
- 28: User Interface Computers.
- 30: Telecommunications Network
- 32: Junction point Simulation Computer
- 34: Telecommunication Network Junction Point Computers

PARALLEL COMPUTER NETWORK AND METHOD FOR TELECOMMUNICATIONS NETWORK SIMULATION TO ROUTE CALLS AND CONTINUOUSLY ESTIMATE CALL BILLING IN REAL TIME

CROSS REFERENCE TO RELATED APPLICATION

This application relates to the same subject matter as a provisional patent application, Ser. No. 60/184,537 filed by the same inventor on Feb. 24, 2000. This application claims the Feb. 24, 2000 filing date as to the common subject matter.

BACKGROUND OF THE INVENTION

1. Field of the Invention

The present invention relates generally to the field of computer networks, data accessing and processing systems. More specifically the present invention relates to a system of computers linked into a neural simulation network, or hive, with neural elements at remote sites which mimics and is placed in parallel operation, switch by switch, with an existing call routing telecommunications network to simulate the operation of the telecommunications network. The simulation network plots a call routing vector by forwardly chaining vector links through the simulation network and relaying as a response, or echo, the vector information so that the call is placed through the telecommunications network with maximum efficiency of bandwidth usage and computer capacity. Assume, for example, that the average call has seven call detail records (CDR's). The present system correlates the billing entity locally, so that the system finds and sends only the one real CDR that the system has determined to have all the valid call components. The remaining six CDR's are thereby eliminated locally and are not transmitted to a central computer since they are redundant, and six sevenths, or 86 percent of bandwidth is saved. Thus the routing vector determines which telecommunications provider will own the call and thus determines the billing rate for the call, the rate information being incorporated into the call routing vector data. The billing rate is estimated from the moment the call is initiated, and the accuracy of the estimate increases as the call progresses so that billing takes place in real time. This billing method is known as a "fuzzy system" because it takes partial data samples and continuously projects an estimated total in real time. The more data exchanged through system messages, that is through chaining, the more accurate the extrapolation becomes, until it reaches one hundred percent accuracy. The interactive simulation creates a data warehouse virtual environment.

2. Description of the Prior Art

There have long been individual computers loaded with programs for routing telephone calls and generating billing for telephone and electrical utilities, which rely upon the processing power and data within the single computer. A problem with these single computer applications has been that more processing power and data access capability are needed, as well as reduced bandwidth usage, together with web and virtual world access. Another related problem is that billing is not done in real time, which particularly complicates debiting of calling cards. Solutions to these problems are presented in the published doctoral dissertation of the present inventor, entitled *Designing Hot Billing Systems for Large Volume and/or Complex Networks*, submitted for the degree of Doctor of Philosophy in Management for the present inventor at California Coast University in November of 1999, the contents of which are incorporated by reference. Also incorporated by reference are the contents of a provisional patent application filed by the present inventor on Feb. 24, 2000, Ser. No. 60/184,537, entitled Intelligent Component Billing System.

It is thus an object of the present invention to provide a computer network system which parallels and simulates an existing telecommunications network, but is not part of the telecommunications network, so that the system does not tax the capacity of the existing network.

It is another object of the present invention to provide such a computer network system which plots and updates a call routing vector for each call through forward chaining of vector links and relays the vector information to the telecommunications network through rearward chaining for placement of the call. The system would determine routing vectors for all calls, whether individually or for clusters of calls, from point A to point B and monitor and change the vector as necessary to avoid a network trouble area or to maximize available bandwidth usage. Thus, network traffic is analyzed, and an assigned vector is launched, which contains the latest network routing traffic patterns that the hive has chosen.

It is another object of the present invention to provide such a computer network system which plots a call routing vector providing the lowest billing rate available for that call at that moment and containing pricing data so that billing begins at the moment a call is initiated and continues in real time as the call progresses.

It is another object of the present invention to provide such a simulation network which minimizes bandwidth usage by performing call routing calculations at individual junction points within the telecommunications network and sending only summarized information packets over network links.

It is still another object of the present invention to provide such a network system which maximizes telecommunications network processing power by shunting calls from computers momentarily operating at or near capacity and thus having smaller buffers to less taxed computers having larger buffers.

It is a still further object of the present invention to provide such a network system which operates in conjunction with old telecommunications technology, so that existing equipment is not wasted and the cost of updating is minimized.

It is yet another object of the present invention to provide such a network system which troubleshoots a telecommunications network to minimize telecommunications network downtime because a repair crew is warned virtually immediately of the nature and location of the problem and the system is maintained with a proactive preventative maintenance.

It is finally an object of the present invention to provide such a network system which is relatively redundant and inexpensive to assemble and operate.

SUMMARY OF THE INVENTION

The present invention accomplishes the above-stated objectives, as well as others, as may be determined by a fair reading and interpretation of the entire specification.

A telecommunications call routing and billing computer system is provided, including a telecommunications network including a junction point, including a call routing switching device, and including two call routing links meeting at the junction point in communication with each other through the call routing switching device, and a call routing simulation network including a junction point simulation computer located at the junction point and in communication with the call routing switching device and the two call routing links.

The call routing switching device is typically a telecommunications network computer. The telecommunications network typically includes a large number of the junction points, each including call routing switching device, and each call routing switching device is connected to two call routing links which connect to other junction points; and the call routing simulation network typically includes a large number of the junction point simulation computers, each located at one of the junction points and in communication with the switching device at the given junction point and with the call routing links at the given junction point.

A call routing and billing computer system is further provided for use in combination with a telecommunications network having a number of call junction points including call routing switching devices interconnected by call routing links, the telecommunication call routing and billing computer system including a simulation network including a number of junction point simulation computers networked to each other to function as a unit and to define a data warehouse virtual environment, each junction point simulation computer having its own location identification indicia, one of the junction point simulation computers being located at each of several of the call junction points to make switching decisions at each call junction point; the simulation network having computer programming to simulate the operation of the telecommunications network for each call placed through the telecommunications network by forward chaining of the call through the simulation network from the point of call origin to the point of call destination to determine all of the links making up a routing vector for the call and to determine misuse of the existing resources, and by rearward chaining of routing vector information through the simulation network to the point of call origin.

The simulation network preferably includes at least one parent simulation computer synchronizing and delegating tasks among a number of the junction point simulation computers. The simulation network preferably includes a hierarchy of parent simulation computers, each parent simulation computer synchronizing and delegating tasks among simulation computers lower in the hierarchy. Each call junction point typically includes a telecommunications network call routing switch. Each call junction point preferably includes a simulation network call routing switch. The hierarchy of simulation computers preferably additionally includes at least one dedicated computer for performing a specific task, and at least one processing computer for providing processing power to the unit. The simulation network may deliver summaries of test routing information in the form of reports to a user computer terminal.

The forward and rearward chaining preferably determines and relays estimated billing information to the telecommunications network as a call is placed in substantially real time. The junction point simulation computer location identification indicia each preferably include an identification number. The unit preferably is linked to a human user computer terminal. The system optionally additionally includes a strategy execution program which stores parameters input by a human user for generation of certain commands in the event that data received from the virtual environment produces indicia meeting one of the parameters. The unit preferably additionally computes a bill for each call and generates a billing statement for delivery to the user. The links preferably include direct hyperlinks.

A method is provided of placing a call through such a telecommunications network, including the steps of: placing one junction point simulation computer at each telecommunications network call junction point; for each call placed with the telecommunications network, plotting a call routing vector through the simulation network with forward chaining through the junction point simulation computers; and sending routing vector information back through the simulation network with rearward chaining to direct the call along a parallel routing vector through the telecommunications network.

The method preferably includes the additional steps of: monitoring buffer levels of telecommunications network junction point computers with the simulation computer at each junction point; and using the buffer level information to shunt calls from telecommunications network junction point computers having smaller buffers to telecommunications network junction point computers having larger buffers. The method preferably includes the further step of: selecting a call provider offering the lowest rates during the forward and rearward chaining. The method preferably includes the still additional steps of: performing at every binary time interval a network diagnostic of the entire simulation network, and thus of the telecommunications network to detect system failure; and plotting new call routing vectors upon detection of a system failure which avoid the system failure, and can modify central office switches and change the route. Furthermore, it can also programmably modify route tables, trunk tables, add and remove users, and block, listen to or monitor and test calls for security reasons. The hive simulation computers send test calls to each other to make sure the system is fully integrated. Placement of these test calls is triggered by detected routing problems, and further user calls are then blocked during testing. Thus we are optimizing the system for performance. In addition, each local data warehouse has the conditions and route patterns of the entire network. And with this information every time a call is initiated, the local hives know the exact routes of each specific call that goes through the network.

BRIEF DESCRIPTION OF THE DRAWINGS

Various other objects, advantages, and features of the invention will become apparent to those skilled in the art from the following discussion taken in conjunction with the following drawings, in which:

FIGS. 1 through 7 are included to show the complexity of large networks.

FIG. 1 is a diagram of two and four node networks.

FIG. 2 is a graph showing how complexity increases with network size.

FIG. 3 is shows how management reduces complexity.

FIG. 4 shows a management synergy example between headquarters 1, 2, and 3 (HQ1, HQ2, and HQ3).

FIG. 5 shows the linkage between Intelligent Billing System (IBS) and Total Quality Management (TQM).

FIG. 6 is a graph showing the complexity of multiple node networks.

FIG. 7 is a graph showing the complexity of single node networks.

FIGS. 8 through 15 show how calls occur within a present telephone network.

FIG. 8 is a diagram of an Intra Central Office Call (HQ0 parent).

FIG. 9 is a diagram of an Intra Exchange Office Call (HQ1 parent).

FIG. 10 is a diagram of an Intra Numbering Plan Area (NPA), commonly known as area code, Call (HQ2 parent).

FIG. 11 is a diagram of an Intra Local Access and Transfer Area (LATA) Call (HQ3 parent).

FIG. 12 is a diagram of an Intra Regional Call (HQ4 parent).

FIG. 13 is a diagram of an Inter Regional Call (HQ5 parent).

FIG. 14 is a diagram of an International Long Distance Call (HQ5 parent).

FIGS. 15 through 23 show and describe how a billing entity is generated using CDR as the source of data, according to the Doctoral Dissertation of the present inventor.

FIG. 15 is an example of an Intelligent Component (IC).

FIG. 16 is an example of an Intelligent Data Warehouse/Intelligent Network Information Warehouse (IDW/INIW).

FIG. 17 is a schematic representation of an IBS method of generating an IBS_Valid_CDR from a CO (Intra CO call HQ0).

FIG. 18 is a schematic representation of an IBS method of generating an IBS_Valid_CDR from a CO (Intra NXX call HQ1).

FIG. 19 is a schematic representation of an IBS method of generating an IBS_Valid_CDR from a CO (Intra NPA call HQ2).

FIG. 20 is a schematic representation of an IBS method of generating an IBS_Valid_CDR from a CO (Intra LATA call HQ3).

FIG. 21 is a schematic representation of an IBS method of generating an IBS_Valid_CDR from a CO (Intra Regional call HQ4).

FIG. 22 is a schematic representation of an IBS method of generating an IBS_Valid_CDR from a CO (Intra Regional call HQ5).

FIG. 23 is a schematic representation of an IBS method of generating an IBS_Valid_CDR from a CO (International call HQ5).

FIGS. 24 through 30 show how to build a billing entity from network packets.

FIG. 24 is a schematic representation of an IBS method of generating an IBS_Vector_CDR from SS7 protocol packets (ISUP and/or ATM) Intra-CO call (HQ0 Parent).

FIG. 25 is a schematic representation of an IBS method of generating an IBS_Vector_CDR from SS7 protocol packets (ISUP and/or ATM) Intra-NXX call (HQ1 Parent).

FIG. 26 is a schematic representation of an IBS method of generating an IBS_Vector_CDR from SS7 protocol packets (ISUP and/or ATM) Intra-NPA call (HQ2 Parent).

FIG. 27 is a schematic representation of an IBS method of generating an IBS_Vector_CDR from SS7 protocol packets (ISUP and/or ATM) Intra-LATA call (HQ3 Parent).

FIG. 28 is a schematic representation of an IBS method of generating an IBS_Vector_CDR from SS7 protocol packets (ISUP and/or ATM) Intra-Regional call (HQ4 Parent).

FIG. 29 is a schematic representation of an IBS method of generating an IBS_Vector_CDR from SS7 protocol packets (ISUP and/or ATM) Inter-Regional call (HQ5 Parent).

FIG. 30 is a schematic representation of an IBS method of generating an IBS_Vector_CDR from SS7 protocol packets (ISUP and/or ATM) Inter-National call (HQ5 Parent).

FIGS. 31 through 37 show and explain in detail the geography and the actual Beowulf configuration for the system.

FIG. 31 is a schematic sample Bell South Telecommunications (BST) organizational hierarchy structure.

FIG. 32 is a schematic sample North Florida Network.

FIG. 33 is a schematic sample Central Florida Network.

FIG. 34 is a schematic sample South Florida Network.

FIG. 35 is a schematic sample Alabama—Georgia Network.

FIG. 36 is a schematic sample Tennessee—Kentucky Mississippi—Louisiana Network.

FIG. 37 is a schematic South Carolina—North Carolina Network.

DETAILED DESCRIPTION OF THE PREFERRED EMBODIMENTS

Figure 38:
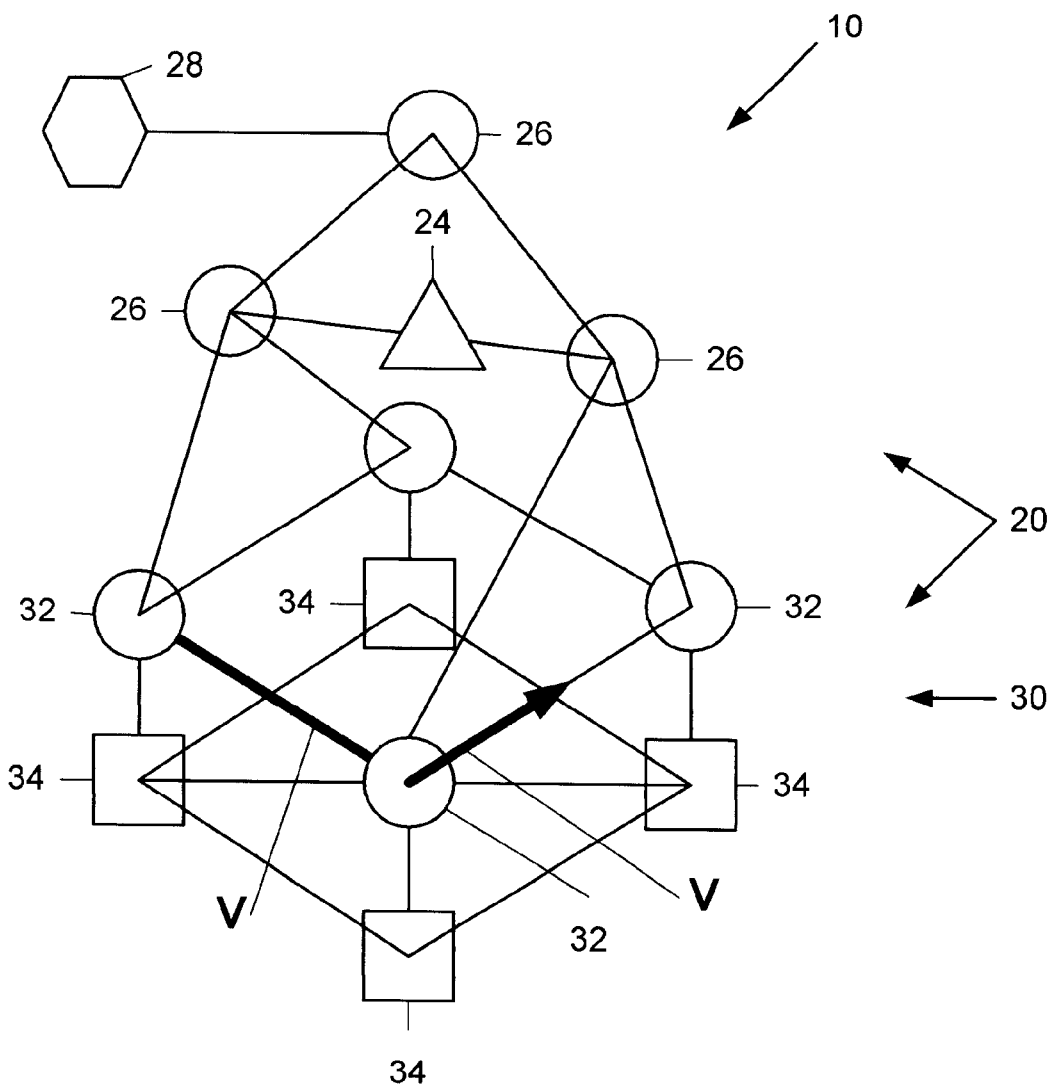
FIG. 38 is a schematic representation of the parallel telecommunications and simulation networks.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

The Basic System Element

The essential element from which the system 10 is constructed is a pair of network links, represented in FIG. 15 as Leg A and Leg B, meeting at a junction point in the form of a telecommunications junction point computer 34 functioning as a call routing switch. See FIG. 38. A junction point simulation computer 32 having a unique programmed identification number is connected to the telecommunications network junction point computer 34 to monitor the junction point computer 34 level of activity and simulate its operation. Vast numbers of these elements make up the parallel telecommunications and simulation networks. A call test run is first made through the junction simulation computers, tagging junction points by identification numbers to construct a call routing vector, and the call is placed through the telecommunications network.

The System

Referring generally to FIGS. 1–38, and specifically to FIG. 38, the present system 10 replaces existing centralized large routing and billing computers with the simulation network 20, which comprises a hive of relatively inexpensive, smaller computers, interlinked as a hierarchy and including parent and junction point simulation computers 26 and 32, respectively, dedicated computers 22 for performing specific tasks and other computers 24 to provide processing power and still others at the peak of the command hierarchy to synchronize and delegate tasks among the various interlinked simulation computers with continuous automatic reevaluation and redirection in real time. A parent computer 26 may be one computer or multiple computers working together in parallel using Beowulf-like technology, and this system 10 takes advantage of this technology to make super computers at a very low cost. In this way, these smaller simulation computers are spread throughout the telecommunications network 30, and simulate the operations of the telecommunications network 30. The telecommunications network is divided broadly at certain junction points into Local Access and Transport Areas hereinafter referred to as LATA's, each of which may be one or more telephone area codes. Within each LATA, and thus within the region of one or more area codes, one point of presence, hereinafter referred to as POP switches, there is a table of local Tandem Office Switches, hereinafter referred to as Tandems, which for example might be telephone exchanges defined by the first three numbers of a local telephone number. A test call routing vector V is progressively constructed for each individual call by forward chaining through the simulation computers, through a series of the junction points separating LATA's, point of presence (POP) switches within each LATA, Tandems within each POP switch, and ultimately the specific telephone numbers within each central office switch, hereinafter referred to as CO, which has the local loops or telephone lines.

The simulation computers monitor activity and buffer levels of telecommunications computers 34 and use the information to make call routing decisions which shunt calls from telecommunications network computers 34 operating at or near capacity and thus having smaller buffers to computers 34 having larger buffers and to call providers offering the lowest rates. The simulation network 20 also saves bandwidth by making these call switching and routing decisions with the simulation computer 32 at each junction point and sending only information about the result of each decision to a parent computer 26 within the simulation hierarchy, rather than all of the information involved making each decision, and by sending confirming vector routing information back to a parent computer 26 in the hive in small, summarized information packets which occupy minimal bandwidth. Furthermore, it is the task of the system 10 to define which is the valid CDR, thus rendering the remaining CDR's obsolete.

System 10 integrity is monitored for rapid detection of malfunctions, so that proactive preventative maintenance is provided, thereby minimizing downtime. Hyperlinks are preferred over modems due to their larger band width.

In this way, the inventive simulation network 20 hive computers combine synergistically to minimize system 10 cost, to permit parallel simulation, to increase processing power, to minimize bandwidth usage, to permit forward and rearward chaining to maximize efficiency in telecommunications network computer operation and to permit real time fuzzy billing estimations so that billing begins as each call begins and progresses in real time. See *Designing Hot Billing Systems for Large Volume and/or Complex Networks*, present inventor's copyrighted doctoral dissertation enclosed. The processing power and range of functions of the hive is greater than the sum of the processing powers and range of functions of each individual computer making up the hive.

EXAMPLE

An example of an application of the system 10 would be in conjunction with a telecommunications network 30 spanning Florida and Georgia. Florida is divided into three LATA's and Georgia is divided into two LATA's. For calls placed from Florida, the simulation network 20 first links to parent simulation computers 26 controlling calls entering Florida, which check each of the three Florida LATA's to see if the area codes within any Florida LATA match the dialed area code. This is a first step in forward chaining. The question of whether there is a match is answered with the sending of either a "yes" or "no" information packet. If there is no match, the parent simulation computer 26 directs the call to a parent simulation computer 26 controlling call routing in Georgia. Forward chaining further determines which tandems own the call and a vector V is rapidly constructed. Then the completed information is sent through rearward chaining to the hive as a "billing entity", and also preserved locally in the given hive member computer. The information does not have to be requested, but is just automatically sent, and decisions are made with however much data is received. This permits the inventive real time billing provided by the present system 10, so that if the simulation network 20 were placed on the Internet, one could watch ones bill grow in real time as a call progresses.

The parent simulation computers 26 continuously search for the providers giving the best rate at each moment to minimize the cost of each call. The rates of various providers may vary slightly from moment to moment depending on the varying call load experienced by each given provider.

System 10, for example, re-routes calls to remote locations if local facilities are near capacity. This re-routing has a cost, but the parent simulation computer 26 weighs costs and suggests the most economical route to Italy or France, for example, so that the cost of the call is ultimately minimized. Calls are filtered to let just certain ones through, whether to MCI, AT&T or to some other carrier.

Method

In practicing the invention, the following method may be used. The method of optimizing parameters of telecommunications call placement and billing tasks executed within a virtual environment using the above-described system 10 includes the steps of: placing discrete neural elements of a simulation network 20, in the form of junction point simulation computers 32, at telecommunications network 30 junction point locations; for each call placed with the telecommunications network, plotting a call routing vector V through the simulation network 20 with forward chaining through junction point simulation computers 32; and sending routing vector V information back through the simulation network 20 with rearward chaining to direct the call along a parallel routing vector through the telecommunications network 30.

The method preferably includes the additional steps of: monitoring activity and buffer levels of telecommunications network junction point computers 34 with a junction point simulation computer 32 at each junction point and using the buffer level information to shunt calls from telecommunications network junction point computers 34 operating at or near capacity and thus having smaller buffers to computers 34 having larger buffers and to select a call provider offering the lowest rates at the moment the call is placed.

The method preferably includes the additional step of performing at every binary time interval a network diagnostic of the entire simulation network 20, and thus of the telecommunications network 30, and plotting new call routes in the case of a system failure or misuse of existing resources, such as inadequate use of network traffic routes. The result is lower downtimes because a repair crew is warned almost immediately and the system is maintained with a proactive preventative maintenance.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A telecommunications call routing and billing system having a multi-tiered network of computers having a configuration for replicating all of the network traffic information within a telecommunications network, the telecommunications network comprising a plurality of network platform equipment components for enabling circuit-switched call connections, the call routing and billing system comprising:

a first tier of computers each communicatively mapped to a single central office (CO) switch of said telecommunications network in such a manner that the first tier of computers operate in unison to replicate all inbound and outbound network traffic within each central office switch of said network;

a second tier of computers subdivided into computer clusters, each second tier computer cluster communicatively mapped to a single NXX exchange switch of the network and configured for replicating and coordinating all inbound and outbound network traffic within said NXX exchange and controlling all of the first tier computers within said NXX exchange;

a third tier of computers subdivided into computer clusters, each third tier computer cluster communicatively mapped to a single point of presence (POP) representing a number plan area (NPA) within the telecommunications network and controlling all of the second tier computer clusters within the NPA;

a fourth tier of computers subdivided into computer clusters, each fourth-tier computer cluster communicatively mapped to a LATA gateway of the network and configured for replicating and coordinating all inbound and outbound network traffic within the LATA gateway and controlling all of the third tier computer clusters within the LATA gateway;

a fifth tier of computers subdivided into computer clusters, each fifth-tier computer cluster communicatively mapped to a region comprising a plurality of LATAs within the network, and each fifth-tier computer cluster configured for replicating and coordinating all inbound and outbound network traffic within the region and controlling all of the fourth tier computer clusters within the region;

a sixth tier group of computers communicatively mapped to a network domain comprising all of said regions within the network and configured for replicating and coordinating all local inbound and outbound network traffic within said domain; and a seventh tier group of computers communicatively mapped to a plurality of international gateways of said telecommunications network, each international gateway corresponding to the long-distance or international call traffic of a network call carrier, said seventh tier group of computers configured for replicating and coordinating all long-distance and international call traffic within the network, said multi-tiered network of computers providing real-time simulation of the operation of the telecommunications network for each call placed through the telecommunications network by forwarding chaining of each call through the computer network from a point of call origin to a point of call destination to determine all of the links making up a routing vector for the call, and by rearward chaining of the routing vector information through the computer network to the point of call origin in order to effect generation of billing entities for each call prior to the corresponding generation of billing records by said telecommunications network.

* * * * *